US012631981B2

(12) United States Patent
Chimoto et al.

(10) Patent No.: US 12,631,981 B2
(45) Date of Patent: May 19, 2026

(54) TONER

(71) Applicant: CANON KABUSHIKI KAISHA, Tokyo (JP)

(72) Inventors: Yuya Chimoto, Chiba (JP); Masayuki Hama, Ibaraki (JP); Hayato Ida, Ibaraki (JP); Kouichirou Ochi, Chiba (JP); Kazuhisa Shirayama, Tokyo (JP); Hisasuke Kajihara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 944 days.

(21) Appl. No.: 17/457,766

(22) Filed: Dec. 6, 2021

(65) Prior Publication Data

US 2022/0197166 A1 Jun. 23, 2022

(30) Foreign Application Priority Data

Dec. 17, 2020 (JP) ................................ 2020-209735
Nov. 2, 2021 (JP) ................................ 2021-179772

(51) Int. Cl.
*G03G 9/097* (2006.01)
*G03G 9/08* (2006.01)
*G03G 9/087* (2006.01)

(52) U.S. Cl.
CPC ......... *G03G 9/09708* (2013.01); *G03G 9/081* (2013.01); *G03G 9/0819* (2013.01); *G03G 9/08755* (2013.01); *G03G 9/09725* (2013.01)

(58) Field of Classification Search
CPC .. G03G 9/09708; G03G 9/081; G03G 9/0819; G03G 9/08755; G03G 9/09725
See application file for complete search history.

(56) References Cited

U.S. PATENT DOCUMENTS

| | | | |
|---|---|---|---|
| 6,430,384 | B2 | 8/2002 | Hama et al. |
| 7,135,263 | B2 | 11/2006 | Kawakami et al. |
| 7,833,687 | B2 | 11/2010 | Kato et al. |
| 8,697,327 | B2 | 4/2014 | Shibata et al. |
| 8,921,023 | B2 | 12/2014 | Baba et al. |
| 8,927,188 | B2 | 1/2015 | Naka et al. |
| 9,057,970 | B2 | 6/2015 | Ida et al. |
| 9,348,247 | B2 | 5/2016 | Ida et al. |
| 9,348,253 | B2 | 5/2016 | Kanno et al. |
| 9,540,483 | B2 | 1/2017 | Ida et al. |
| 9,651,883 | B2 | 5/2017 | Hama et al. |
| 9,665,023 | B2 | 5/2017 | Kamae et al. |
| 9,696,644 | B2 | 7/2017 | Ida et al. |
| 9,897,934 | B2 | 2/2018 | Tamura et al. |
| 9,904,190 | B2 | 2/2018 | Dan |
| 10,012,920 | B2 | 7/2018 | Shibata et al. |
| 10,036,970 | B2 | 7/2018 | Kanno et al. |
| 10,078,281 | B2 | 9/2018 | Ida et al. |
| 10,082,743 | B2 | 9/2018 | Hama et al. |
| 10,088,765 | B2 | 10/2018 | Miyakai et al. |
| 10,146,146 | B2 | 12/2018 | Komatsu et al. |
| 10,175,595 | B2 | 1/2019 | Onozaki et al. |
| 10,197,936 | B2 | 2/2019 | Onozaki et al. |
| 10,203,619 | B2 | 2/2019 | Yamashita et al. |
| 10,228,629 | B2 | 3/2019 | Tamura et al. |
| 10,274,851 | B2 | 4/2019 | Hashimoto et al. |
| 10,353,312 | B2 | 7/2019 | Kamae et al. |
| 10,401,748 | B2 | 9/2019 | Hashimoto et al. |
| 10,423,086 | B2 | 9/2019 | Hama et al. |
| 10,451,986 | B2 | 10/2019 | Sano et al. |
| 10,451,990 | B2 | 10/2019 | Kamae et al. |
| 10,474,049 | B2 | 11/2019 | Onozaki et al. |
| 10,514,624 | B2 | 12/2019 | Tamura et al. |
| 10,564,560 | B2 | 2/2020 | Onozaki et al. |
| 10,599,060 | B2 | 3/2020 | Kanno et al. |
| 10,656,545 | B2 | 5/2020 | Kamae et al. |

(Continued)

FOREIGN PATENT DOCUMENTS

| | | | |
|---|---|---|---|
| JP | 8-339095 | A | 12/1996 |
| JP | 11-7159 | A | 1/1999 |

(Continued)

OTHER PUBLICATIONS

SOFTON_BF series. (n.d.). https://www.bihokufunka.co.jp/softon_e.html (Year: 2015).*
English machine translation of the description of JP-2014145886-A (Year: 2014).*
Kaolin Extenders for Coatings and Inks. KaMin Solutions. (2023). https://www.l-i.co.uk/images/brochure/70/1/LI-BROCH KaMinKaolinExtenders Brochure.pdf (Year: 2023).*
U.S. Appl. No. 17/457,822, Hisasuke Kajihara, filed Dec. 6, 2021.
U.S. Appl. No. 17/536,853, Hisasuke Kajihara, filed Nov. 29, 2021.
U.S. Appl. No. 17/542,006, Masaharu Miura, filed Dec. 3, 2021.
U.S. Appl. No. 17/648,330, Hiroki Watanabe, filed Jan. 19, 2022.

(Continued)

*Primary Examiner* — Mark F. Huff
*Assistant Examiner* — Boone Alexander Evans
(74) *Attorney, Agent, or Firm* — VENABLE LLP

(57) ABSTRACT

A toner including a toner particle which contains: a resin component containing a binder resin; and an inorganic fine particle, the inorganic fine particle is at least one inorganic fine particle selected from the group consisting of (i) a particle containing $CaCO_3$, (ii) a particle containing $BaSO_4$, (iii) a particle containing $Mg_3Si_4O_{10}(OH)_2$, and (iv) a particle containing $Al_2Si_2O_5(OH)_4$, a number average particle diameter Dc of a primary particle of the inorganic fine particle is 100 nm or more and 1000 nm or less, when a cross section of the toner particle is observed, an inorganic fine particle domain A having a dispersion diameter of 2.0 times or more of Dc is present in the cross section, and the inorganic fine particle and the inorganic fine particle domain A occupy a specific percentage of an area in the cross section of the toner particle.

10 Claims, No Drawings

(56) References Cited

U.S. PATENT DOCUMENTS

| | | | | |
|---|---|---|---|---|
| 10,775,710 | B1 | 9/2020 | Kamae et al. | |
| 10,859,931 | B2 | 12/2020 | Hashimoto et al. | |
| 10,877,386 | B2 | 12/2020 | Murayama et al. | |
| 10,969,705 | B2 | 4/2021 | Shirayama et al. | |
| 11,029,617 | B2 | 6/2021 | Chimoto et al. | |
| 11,112,711 | B2 | 9/2021 | Ochi et al. | |
| 11,131,939 | B2 | 9/2021 | Hama et al. | |
| 11,181,848 | B2 | 11/2021 | Ochi et al. | |
| 2013/0108955 | A1 | 5/2013 | Shibata et al. | |
| 2014/0134535 | A1 | 5/2014 | Baba et al. | |
| 2014/0363209 | A1* | 12/2014 | Inoue | G03G 9/08795 430/109.4 |
| 2015/0099227 | A1 | 4/2015 | Ida et al. | |
| 2017/0082933 | A1* | 3/2017 | Dan | G03G 9/09783 |
| 2017/0315461 | A1* | 11/2017 | Komatsu | G03G 9/08795 |
| 2018/0004106 | A1* | 1/2018 | Matsui | G03G 9/08711 |
| 2018/0314176 | A1 | 11/2018 | Ikeda et al. | |
| 2020/0310273 | A1 | 10/2020 | Chimoto et al. | |
| 2020/0409284 | A1 | 12/2020 | Matsubara et al. | |
| 2020/0409285 | A1 | 12/2020 | Tokunaga et al. | |
| 2021/0080848 | A1 | 3/2021 | Tsuchida et al. | |
| 2021/0141315 | A1 | 5/2021 | Kamae et al. | |
| 2021/0181647 | A1 | 6/2021 | Hashimoto et al. | |
| 2021/0181649 | A1 | 6/2021 | Kanno et al. | |
| 2021/0181650 | A1 | 6/2021 | Hama et al. | |
| 2021/0181651 | A1 | 6/2021 | Kanno et al. | |
| 2021/0278774 | A1 | 9/2021 | Hashimoto et al. | |
| 2021/0278775 | A1 | 9/2021 | Kamae et al. | |

FOREIGN PATENT DOCUMENTS

| | | | | |
|---|---|---|---|---|
| JP | 2010-39314 | A | 2/2010 | |
| JP | 2013-200559 | A | 10/2013 | |
| JP | 2014145886 | A * | 8/2014 | G03G 9/08724 |
| JP | 2016-114828 | A | 6/2016 | |
| JP | 6089726 | B2 | 3/2017 | |
| JP | 6535988 | B2 | 7/2019 | |

OTHER PUBLICATIONS

U.S. Appl. No. 17/648,333, Ichiro Kanno, filed Jan. 19, 2022.
U.S. Appl. No. 17/648,368, Ichiro Kanno, filed Jan. 19, 2022.
U.S. Appl. No. 17/654,461, Yukihiro Abe, filed Mar. 11, 2022.
U.S. Appl. No. 17/654,481, Kazuki Murata, filed Mar. 11, 2022.
U.S. Appl. No. 17/656,282, Takeshi Hashimoto. filed Mar. 24, 2022.

* cited by examiner

TONER

BACKGROUND OF THE INVENTION

Field of the Invention

The present invention relates to a toner used in an electrophotographic image forming method.

Description of the Related Art

In recent years, electrophotographic full-color copying machines have become widely available and are beginning to be utilized in the printing market. In the printing market, while being applicable to a wide range of media (paper types), there is an emerging demand for low running cost as well as high speed, high image quality, and high productivity.

In response to such a demand, there have been conducted studies of adding an inorganic fine particle such as calcium carbonate, barium sulfate, kaolin, or talc to a toner particle (For example, Japanese Patent No. 6535988, Japanese Patent No. 6089726, Japanese Patent Application Laid-Open No. 2016-114828, and Japanese Patent Application Laid-Open No. H08-339095). Such inorganic fine particle is also called an extender pigment, which is used for the purpose of improving a physical property of a material to be added, reducing the cost, and the like. By adding such an inorganic fine particle to a toner particle, there is a possibility that a hot offset resistance, which is obtained by a filler effect, of a toner is enhanced and furthermore a cost reduction can be achieved by reducing used amounts of other raw materials for the toner.

The toner described in Japanese Patent No. 6535988, Japanese Patent No. 6089726, Japanese Patent Application Laid-Open No. 2016-114828, or Japanese Patent Application Laid-Open No. H08-339095 has a high level of hot offset resistance, but, in some cases, its abrasion resistance was insufficient in an obtained image, particularly in an image area where a toner laid-on level is low.

SUMMARY OF THE INVENTION

Hence, an object of the present invention is to provide a toner that has a high level of hot offset resistance and an excellent abrasion resistance in an image where a toner laid-on level is low.

A toner according to one aspect of the present invention includes a toner particle, the toner particle contains: a resin component containing a binder resin; and an inorganic fine particle, the inorganic fine particle is at least one inorganic particle selected from the group consisting of
(i) a particle containing $CaCO_3$,
(ii) a particle containing $BaSO_4$,
(iii) a particle containing $Mg_3Si_4O_{10}(OH)_2$, and
(iv) a particle containing $Al_2Si_2O_5(OH)_4$, when a number average particle diameter of a primary particle of the inorganic fine particle is denoted by Dc, Dc is 100 nm or more and 1000 nm or less, when a cross section of the toner particle is observed, an inorganic fine particle domain A having dispersion diameter of 2.0 times or more of Dc is present in the cross section, and when an area of the cross section of the toner particle is denoted by S, a sum of areas occupied by the inorganic fine particle in the cross section is denoted by ST, and a sum of areas occupied by the inorganic fine particle domain A in the cross section is denoted by SA, S, ST, and SA satisfy the following relationships:

$$1.0 \leq ST/S \times 100 \leq 20.0 \text{ and}$$

$$0.5 \leq SA/S \times 100 \leq 10.0.$$

Further features of the present invention will become apparent from the following description of exemplary embodiments.

DESCRIPTION OF THE EMBODIMENTS

Preferred embodiments of the present invention will now be described in detail.

In the present invention, an expression of "XX or more and YY or less" or "from XX to YY" indicating a numerical range means a numerical range including a lower limit and an upper limit which are end points unless otherwise specified.

The following consideration can be made for a reason why an abrasion resistance of an image becomes insufficient particularly in an image area where a toner laid-on level is low in the techniques described in Japanese Patent No. 6535988, Japanese Patent No. 6089726, Japanese Patent Application Laid-Open No. 2016-114828, and Japanese Patent Application Laid-Open No. H08-339095.

The toner particle contains an inorganic fine particle, whereby the mechanical strength and the internal cohesive force of the toner particle are enhanced, but on the other hand the toner particle is less likely to melt and spread at a time of heating. As a result of this, the surface of an obtained image becomes rough. In an image having a rough surface, a strong frictional force is likely to be arisen at a convex part of the image surface when it is rubbed.

In an image formed by using the toner described in Japanese Patent No. 6535988, Japanese Patent No. 6089726, Japanese Patent Application Laid-Open No. 2016-114828, or Japanese Patent Application Laid-Open No. H08-339095, a toner density on the image is high, and an interaction between fused toners is strong in a region such as a solid image where a toner laid-on level is high. Therefore, even when a strong frictional force is applied to the convex part of the image surface due to rubbing, the image is less likely to be peeled off. On the other hand, there can be considered that in a region such as a halftone image where a toner laid-on level is low, the toner density on the image is low and the interaction between the toners is weak, so that the image is likely to be peeled off in a case where a strong frictional force is applied to the convex part of the image surface due to rubbing.

In contrast, an abrasion resistance can be improved in a region where a toner laid-on level is low by reducing an amount of inorganic fine particle such as calcium carbonate in the toner particle, but the hot offset resistance becomes insufficient since the filler effect is reduced.

As a result of intensive studies made by the present inventors, it has been found that the above problems can be solved by an inclusion of a specific amount of a structure (referred to as a domain) in which inorganic fine particles such as calcium carbonate are aggregated in a toner particle.

It is not clear about the mechanism by which the problem described above can be solved in the toner according to the present invention, but the following consideration can be made.

In a case where an inorganic fine particle such as calcium carbonate forms a domain in the toner particle, it can be considered that the domain is present in a part of a vicinity of a surface of an image after fixing. At a time when an image having a domain in the vicinity of the surface is rubbed by a rubbing body such as a medium, a load is applied to the domain present in the vicinity of the surface.

The domain is a structure in which inorganic fine particles are aggregated, and the interaction between the inorganic fine particles in the domain is weaker than the interaction between other components in the toner. Therefore, it can be considered that at the time when the image is rubbed an inorganic fine particle is partially detached from a domain where the internal interaction is relatively weak. The detached inorganic fine particle brings about a lubricating action on the rubbing between the image and the rubbing body, and alleviates the frictional force due to the rubbing. Herewith, the image is considered to be less likely to be peeled off at the time when the image is under rubbing. From above, it can be considered that the toner, which contains a specific amount of domains in the toner particle, according to the present invention has an excellent abrasion resistance.

Furthermore, a part of the domain, which is in contact with a binder resin, brings about an improvement in hot offset resistance caused by a filler effect. Therefore, it can be considered that the toner, which contains a specific amount of domains, according to the present invention can achieve a balance between the abrasion resistance and the hot offset resistance at a higher level than before.

A weight average particle diameter of the toner according to the present invention is preferably 3.0 μm or more and 20.0 μm or less, and more preferably 4.0 μm or more and 10.0 μm or less.

The toner according to the present invention includes a toner particle, the toner particle contains: a resin component containing a binder resin; and an inorganic fine particle. Hereinafter, each component of the toner according to the present invention will be described.

<Inorganic Fine Particle>

An inorganic fine particle contained in the toner particle is at least one inorganic fine particle selected from the group consisting of a particle containing $CaCO_3$, a particle containing $BaSO_4$, a particle containing $Mg_3Si_4O_{10}(OH)_2$, and a particle containing $Al_2Si_2O_5(OH)_4$.

$Mg_3Si_4O_{10}(OH)_2$ is hydrous magnesium silicate. Examples of the particle containing $Mg_3Si_4O_{10}(OH)_2$ include a talc particle. $Al_2Si_2O_5(OH)_4$ is hydrous aluminum silicate. Examples of the particle containing $Al_2Si_2O_5(OH)_4$ include a kaolin particle and a clay particle.

In the particle containing $CaCO_3$, the content ratio of $CaCO_3$ is preferably 95 mass % or more, and more preferably 98 mass % or more.

In the particle containing $BaSO_4$, the content ratio of $BaSO_4$ is preferably 95 mass % or more, and more preferably 98 mass % or more.

In the particle containing $Mg_3Si_4O_{10}(OH)_2$, the content ratio of $Mg_3Si_4O_{10}(OH)_2$ is preferably 95 mass % or more, and more preferably 98 mass % or more.

In the particle containing $Al_2Si_2O_5(OH)_4$, the content ratio of $Al_2Si_2O_5(OH)_4$ is preferably 95 mass % or more, and more preferably 98 mass % or more.

An inorganic fine particle contained in a toner particle preferably contains a particle containing $CaCO_3$. Since a lubricating action due to detachment from a domain and a filler effect due to an interaction with a resin act appropriately, the particle containing $CaCO_3$ can enhance the hot offset resistance and the abrasion resistance in a well-balanced manner.

When a number average particle diameter of a primary particle of an inorganic fine particle is denoted by Dc, Dc is 100 nm or more and 1000 nm or less. When Dc is within the above range, an appropriate viscoelasticity due to the filler effect is provided to the toner, and a balance between the hot offset resistance and the abrasion resistance can be achieved. Dc is preferably 200 nm or more and 800 nm or less, and more preferably 300 nm or more and 700 nm or less.

Moreover, when a cross section of a toner particle is observed, an inorganic fine particle domain A having a dispersion diameter of 2.0 times or more of Dc is present in the cross section.

Specifically, the inorganic fine particle domain A is a structure that can be observed as follows.

A cross section of the toner particle is prepared by ion milling, the cross section is observed with a scanning electron microscope. As used herein, the cross section of the toner particle to be observed refers to a cross section whose area is equal to a circle which has a diameter (an equivalent circle diameter) that is within ±10% of the weight average particle diameter of the toner particle. Hereinafter, as used in the description of the present specification, the cross section of the toner particle refers to the cross section of the toner particle to be observed as described above.

In the cross section of the toner, an inorganic fine particle dispersed in the toner particle can be observed by a difference in contrast with a binder resin. The dispersed inorganic fine particle is defined as an inorganic fine particle dispersion, and the plurality of inorganic fine particles in contact with each other are defined as one inorganic fine particle dispersion. When the particle diameter (the equivalent circle diameter) of such an inorganic fine particle dispersion is defined as a dispersion diameter, an inorganic fine particle dispersion having a dispersion diameter of 2.0 times or more of Dc is defined as an inorganic fine particle domain A. That is, the larger number of the observed inorganic fine particle domain A means that the more densely inorganic fine particles are packed in the toner particle, and the above-described lubricating action is more likely to be exhibited.

When an area of the cross section of the toner particle is denoted by S, a sum of areas occupied by the inorganic fine particle in the cross section is denoted by ST, and a sum of areas occupied by the inorganic fine particle domain A in the cross section is denoted by SA, S, ST, and SA satisfy the following relationships:

$$1.0 \leq ST/S \times 100 \leq 20.0, \text{ and}$$

$$0.5 \leq SA/S \times 100 \leq 10.0.$$

ST/S×100 indicates a percentage of the inorganic fine particle in the cross section of the toner particle, that is, it reflects an amount of the inorganic fine particle in the toner particle. When ST/S×100 is 1.0 or more, a filler effect is sufficiently exhibited, and a high level of hot offset resistance is obtained. When ST/S×100 is 20.0 or less, the filler effect can be restrained from becoming excessive, the toner does not become hard to deform, and an excellent abrasion resistance can be obtained. Therefore, when ST/S×100 satisfies the above-described range, an action of the filler effect becomes appropriate, and the hot offset resistance and the abrasion resistance are enhanced.

SA/S×100 indicates a percentage of the inorganic fine particle domain A in the cross section of the toner particle, that is, it reflects an amount of the inorganic fine particle domain A present in the toner particle. When SA/S×100 is 0.5 or more, the above-described lubricating action is sufficiently exhibited, and an excellent abrasion resistance is obtained. When SA/S×100 is 10.0 or less, a contact area between the inorganic fine particle and the binder resin becomes sufficiently large, and a high level of hot offset resistance can be obtained. Therefore, when SA/S×100 is in the above-described range, the hot offset resistance and the abrasion resistance are enhanced. From above, when ST/S×100 and SA/S×100 satisfy the above-described relationships at the same time, a balance of the hot offset resistance and the abrasion resistance can be achieved.

When the cross section of the toner particle is observed, it is preferable that an inorganic fine particle domain B having a dispersion diameter of 3.0 times or more of Dc is present in the cross section. The inorganic fine particle domain B can be observed by the same method as described above for the inorganic fine particle domain A, and the inorganic fine particle domain B refers to an inorganic fine particle dispersion having a dispersion diameter of 3.0 times or more of Dc among inorganic fine particle dispersions in the toner particle. The fact that a toner particle contains the inorganic fine particle domain B means that further more inorganic fine particles are densely packed in the toner particle. Therefore, when the toner particle contains the inorganic fine particle domain B, the inorganic fine particle is more likely to be detached, the lubricating action is enhanced, and the abrasion resistance is improved.

When a sum of areas occupied by the inorganic fine particle domain B in the cross section of the toner particle is denoted by SB, S and SB preferably satisfy the following relationship:

$$0.5 \leq SB/S \times 100 \leq 10.0.$$

When SB and S satisfy the relationship of the above formula, the inorganic fine particle is more likely to be detached, and as a result of this, the abrasion resistance is enhanced and the filler effect is also preserved, so that a balance between the abrasion resistance and the hot offset resistance can be achieved.

S, ST, SA, and SB more preferably satisfy the following relationships:

$$2.0 \leq ST/S \times 100 \leq 10.0;$$

$$0.5 \leq SA/S \times 100 \leq 5.0; \text{ and}$$

$$0.5 \leq SB/S \times 100 \leq 5.0.$$

When S, ST, SA, and SB satisfy the relationships of the above formulae, a balance between the lubricating action due to the inorganic fine particle and the filler effect becomes more appropriate, and the abrasion resistance and the hot offset resistance can be enhanced.

Among the inorganic fine particle domain A observed in the cross section of the toner particle, a ratio of the number of the inorganic fine particle domain A present in a region up to 1.0 μm inside from the contour of the cross section of the toner particle is denoted by Pa. Then, Pa is preferably 0.3 or more and 1.0 or less, more preferably 0.5 or more and 1.0 or less, and still more preferably 0.7 or more and 1.0 or less. When Pa is within the above-described range, the inorganic fine particle domain A is likely to exist on the surface of an image, and the abrasion resistance is enhanced.

When the number average value of the dispersion diameter of the inorganic fine particle in the cross section of the toner particle is denoted by Dd, Dd is preferably 200 nm or more and 1500 nm or less. As used herein, the dispersion diameter of the inorganic fine particle refers to a particle diameter (an equivalent circle diameter) of the inorganic fine particle dispersion. When Dd is within the above-described range, an amount of inorganic fine particle that form a domain becomes appropriate, and a hot offset resistance and an abrasion resistance can be enhanced in a well-balanced manner. Dd is more preferably 300 nm or more and 1000 nm or less, and still more preferably 400 nm or more and 700 nm or less.

When the maximum value of the dispersion diameter of the inorganic fine particle in the cross section of the toner particle is denoted by Ddmax, Dd and Ddmax preferably satisfy the relationship of Ddmax/Dd≤5.0. When Dd and Ddmax satisfy the relationship of the above formula, the inorganic fine particle does not excessively form a domain, so that the hot offset resistance is enhanced. Dd and Ddmax more preferably satisfy the relationship of Ddmax/Dd≤4.7, and still more preferably satisfy the relationship of Ddmax/Dd≤4.5.

When an area average particle diameter of a primary particle of the inorganic fine particle is denoted by Da, Dc and Da preferably satisfy the relationship of Da/Dc≤1.5, and more preferably satisfy the relationship of Da/Dc≤1.3. As used herein, the area average particle diameter of a primary particle of the inorganic fine particle refers to an average particle diameter based on an area of an image obtained by observing the primary particle of the inorganic fine particle with a scanning electron microscope (SEM). When Dc and Da satisfy the relationship of the above formula, the filler effect and a cohesive force of the inorganic fine particle domains become appropriate, and the hot offset resistance and the abrasion resistance can be enhanced in a well-balanced manner.

<Binder Resin>

As a binder resin contained in the toner particle, it is possible to use a known polymer, and specifically, the following polymers can be used.

Examples thereof include: homopolymers of styrene and its substitutes, such as polystyrene, poly-p-chlorostyrene, and polyvinyltoluene; styrene-based copolymers such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-α-chloromethacrylic acid methyl copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; polyvinyl chloride, a phenol resin, a natural resin-modified phenol resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, polyvinyl butyral, a terpene resin, a coumarone-indene resin, and a petroleum-based resin. These resins may be used alone or in combination of two or more thereof.

The binder resin preferably has an ester group. When the binder resin has an ester group, an affinity between the binder resin and a polar moiety of the inorganic fine particle is enhanced, and a filler effect per inorganic fine particle is enhanced. As a result of this, a hot offset resistance of the toner is enhanced. Specific examples of preferable binder resins having an ester group include a styrene-acrylic acid ester copolymer and a polyester resin.

<Crystalline Polyester>

A resin component contained in the toner particle preferably further contains a crystalline polyester. When the toner particle contains a crystalline polyester, the toner is easily melted and spread. Furthermore, since a crystalline polyester contains an ester group, the crystalline polyester interacts with an inorganic fine particle and enabling to maintain a high level of hot offset resistance.

The crystalline polyester is preferably a condensate of an aliphatic diol and an aliphatic dicarboxylic acid.

The aliphatic diol is preferably a linear aliphatic diol. Examples of linear aliphatic diols include 1,4-butanediol, 1,5-pentanediol, 1,6-hexanediol, 1,7-heptanediol, 1,8-octanediol, 1,9-nonanediol, 1,10-decanediol, 1,12-dodecanediol, and derivatives thereof.

The derivative is not particularly limited as long as the crystalline polyester obtained by condensation polymerization with an aliphatic dicarboxylic acid has a resin structure which is the same as that of a crystalline polyester obtained by condensation polymerization of an aliphatic dicarboxylic acid and an aliphatic diol that is not a derivative. Examples of the derivatives include a derivative obtained by esterifying an aliphatic diol.

The aliphatic dicarboxylic acid is preferably a linear aliphatic dicarboxylic acid. Examples of aliphatic dicarboxylic acids include malonic acid, succinic acid, glutaric acid, adipic acid, pimelic acid, suberic acid, glutaconic acid, azelaic acid, sebacic acid, hexadecanedioic acid, eicosanedioic acid, and derivatives thereof.

The derivative is not particularly limited as long as the crystalline polyester obtained by condensation polymerization with an aliphatic diol has a resin structure which is the same as that of a crystalline polyester obtained by condensation polymerization of an aliphatic diol and an aliphatic dicarboxylic acid that is not a derivative. Examples of the derivatives include an acid anhydride of an aliphatic dicarboxylic acid, and a derivative obtained by alkyl-esterifying or acid-chlorinating a dicarboxylic acid component.

As a carboxylic acid used for obtaining the crystalline polyester, a carboxylic acid other than an aliphatic dicarboxylic acid may also be used in combination.

The content of the crystalline polyester resin in the toner particle is preferably 0.5 mass % or more and 10.0 mass % or less, and more preferably 1.0 mass % or more and 5.0 mass % or less with respect to the toner particle. When the content of the crystalline polyester resin in the toner particle is within the above-described range, a high level of an improvement effect of hot offset resistance can be obtained.

When the resin component has an ester group, and the content ratio of the resin component contained in the toner particle is denoted by Mr (mass %), the content ratio of the ester group in the resin component is denoted by Er (mass %), and the content ratio of the inorganic fine particle contained in the toner particle is denoted by Mc (mass %), Mr, Er, and Mc preferably satisfy a relationship of $0.5 \leq Mr \times (Er/100)/Mc \leq 3.0$. When Mr, Er, and Mc satisfy the relationship of the above formula, an interaction between the inorganic fine particle and the resin component becomes suitable, and the hot offset resistance is enhanced. Mr, Er, and Mc more preferably satisfy a relationship of $0.8 \leq Mr \times (Er/100)/Mc \leq 2.7$, and still more preferably satisfy a relationship of $1.0 \leq Mr \times (Er/100)/Mc \leq 2.5$.

<Colorant>

The toner particle may further contain a colorant if necessary. As a colorant, a pigment may be used alone, or a dye and a pigment may be used in combination. From a viewpoint of image quality of a full-color image, a dye and a pigment are preferably used in combination. Specific examples of colorants include the following.

Examples of black colorants include: carbon black; a mixture in which a yellow colorant, a magenta colorant, and a cyan colorant are used to adjust a color of black.

Examples of pigments for magenta toner include the following pigments. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, 282; C.I. Pigment Violet 19; C.I. Vat Red 1, 2, 10, 13, 15, 23, 29, 35.

Examples of dyes for magenta toner include the following dyes. C.I. Solvent Red 1, 3, 8, 23, 24, 25, 27, 30, 49, 81, 82, 83, 84, 100, 109, 121; C.I. Disperse Red 9; C.I. Solvent Violet 8, 13, 14, 21, 27; an oil-soluble dye such as C.I. Disperse Violet 1, C.I. Basic Red 1, 2, 9, 12, 13, 14, 15, 17, 18, 22, 23, 24, 27, 29, 32, 34, 35, 36, 37, 38, 39, 40; a basic dye such as C.I. Basic Violet 1, 3, 7, 10, 14, 15, 21, 25, 26, 27, and 28.

Examples of pigments for cyan toner include the following pigments. C.I. Pigment Blue 2, 3, 15:2, 15:3, 15:4, 16, 17; C.I. Vat Blue 6; C.I. Acid Blue 45, a copper phthalocyanine pigment having a phthalocyanine skeleton substituted with 1 to 5 phthalimidomethyl groups.

Examples of dyes for cyan toner include C.I. Solvent Blue 70.

Examples of pigments for yellow toner include the following pigments. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, 185; C.I. Vat Yellow 1, 3, 20.

Examples of dyes for yellow toner include C.I. Solvent Yellow 162.

These colorants can be used alone or in combination, and further can be used in a state of solid solution. The colorant is selected in terms of hue angle, chroma, brightness, light resistance, OHP transparency, and dispersibility in toner.

A content ratio Mp (mass %) of the colorant in the toner particle is preferably 0.5 mass % or more and 20.0 mass % or less, and more preferably 1.0 mass % or more and 10.0 mass % or less with respect to the toner particle.

When a sum of areas occupied by the colorant in the cross section of the toner particle is denoted by SP and a sum of areas occupied by the colorant in the inorganic fine particle domain A is denoted by SC, SP and SC preferably satisfy the following relationship:

$$0.5 \leq SC/SP \times 100 \leq 5.0.$$

When a colorant is present in a domain of the inorganic fine particle, an abrasion resistance is enhanced. This can be considered because that the inorganic fine particle tends to be detached from the domain. When SP and SC satisfy the above formula, the abrasion resistance and the hot offset resistance can be enhanced in a well-balanced manner. SP and SC more preferably satisfy a relationship of $0.7 \leq SP/SC \times 100 \leq 4.5$, still more preferably satisfy a relationship of $1.0 \leq SP/SC \times 100 \leq 4.0$.

<Releasing Agent>

The toner particle may contain a releasing agent if necessary. When the toner particle contains a releasing agent, an occurrence of hot offset can be suppressed at the time of heat fixing of the toner.

Examples of releasing agents generally include low molecular weight polyolefins, silicone waxes, fatty acid amides, ester waxes, carnauba waxes, and hydrocarbon-based waxes.

Hereinafter, there will be described a production method of toner for producing the toner according to the present invention.

<Production Method of Toner>

Examples of production methods of toner include a kneading pulverization process, a dissolution suspension process, a suspension polymerization process, and an emulsion aggregation process. Any one of the producing methods may be used to produce a toner, or any of the producing methods may be combined to produce a toner. There can be exemplified a method in which a kneading pulverization process or a dissolution suspension process is used to obtain a toner particle, on which a shell is formed by an emulsion aggregation process.

Among them, the kneading pulverization process is preferable.

Hereinafter, a production method of toner will be specifically exemplified in the kneading pulverization process, but the method is not limited thereto.

<Kneading Pulverization Process>

In the kneading pulverization process, constituent materials of toner particle are sufficiently mixed, and melt-kneaded using a known heat kneader such as a heating roll or a kneader (Kneading step). Thereafter, the toner particle is mechanically pulverized until a desired particle diameter of the toner is obtained (Pulverization step), and then a classification is conducted so as to obtain a desired particle diameter distribution (Classification step), thereby producing a toner. Hereinafter, each step will be described below.

<Inorganic Fine Particle Pre-Kneading Step>

A production method of the toner according to the present invention, wherein a binder resin includes a binder resin A and a binder resin B, the method preferably includes: an inorganic fine particle pre-kneading step in which a mixture containing the binder resin A and an inorganic fine particle is melt-kneaded to obtain an inorganic fine particle mixture; and a kneading step in which a mixture containing the inorganic fine particle mixture and a binder resin B is melt-kneaded.

The inorganic fine particle pre-kneading step is a step in which a part of a binder resin (binder resin A) and an inorganic fine particle are kneaded to obtain a kneaded product (an inorganic fine particle kneaded product) having a high-concentration of the inorganic fine particle prior to the subsequent kneading step. The inorganic fine particle kneaded product has a high viscosity, and in which inorganic fine particles are densely present. Therefore, the inorganic fine particle kneaded product is added to the remaining binder resin (binder resin B) in the subsequent kneading step, whereby it becomes a condition in which the inorganic fine particle domain A and the inorganic fine particle domain B tend to form in the toner. From above, the production method of toner includes the inorganic fine particle pre-kneading step prior to the kneading step, whereby there can be produced a toner with which a balance between the abrasion resistance and the hot offset resistance is achieved.

The binder resin A and the binder resin B may be the same binder resin, or may be different types of binder resins. When the binder resin A and the binder resin B are the same binder resin, the prepared binder resin may be divided into two, and each of which should be used in the inorganic fine particle pre-kneading step and the kneading step, this is simple and preferable.

It is preferable that a colorant is additionally kneaded together in the inorganic fine particle pre-kneading step. When a colorant is mixed, the viscosity of the inorganic fine particle kneaded product is increased, and a domain tends to be formed. Therefore, there can be produced a toner with which the abrasion resistance and the hot offset resistance are further enhanced.

A ratio of the sum of the inorganic fine particle and the colorant to the inorganic fine particle kneaded product is preferably 50 mass % or more and 90 mass % or less, and more preferably 60 mass % or more and 80 mass % or less. When the ratio of the sum of the inorganic fine particle and the colorant to the inorganic fine particle kneaded product is within the above-described range, the viscosity of the inorganic fine particle kneaded product becomes appropriate, so that it becomes easy to appropriately disperse and adjust an appropriate diameter of the domain in the toner particle. This makes it possible to produce a toner having a high level of abrasion resistance.

In the inorganic fine particle pre-kneading step, it is preferable that ingredient materials are uniformly mixed first prior to conducting kneading. There will be described a raw material mixing step as a step of uniformly mixing ingredient materials.

In the raw material mixing step, at least an inorganic fine particle and a binder resin as a raw material for the inorganic fine particle kneaded product each are weighed for a predetermined amount, then blended and mixed. At this time, it is preferable to additionally mix a colorant.

Examples of mixing devices include a double cone mixer, a V-type mixer, a drum-type mixer, a super mixer, Henschel mixer, and Nauta mixer.

Next, a melt-kneading step will be described as a step in which a kneading is conducted. The mixed raw materials are put into a melt-kneader and melt-kneaded to obtain an inorganic fine particle kneaded product. In the melt-kneading step, there can be used: for example, a batch kneader such as a kneader, a pressure kneader, or Banbury mixer; or a continuous kneader such as a twin-screw extruder or a single-screw extruder. Among them, a twin-screw extruder is preferably used.

<Kneading Step>

The melt-kneading of the constituent materials of the toner particle in the kneading step can be conducted using a known heat kneader such as a heating roll or a kneader. As used herein, the constituent material of the toner particle contains the inorganic fine particle kneaded product and the binder resin B, and may further contain a colorant, a releasing agent, and the like, if necessary.

Examples of heat kneaders include KRC kneader (manufactured by Kurimoto, Ltd.); Buss Co-Kneader (manufactured by Buss); TEM type extruder (manufactured by TOSHIBA MACHINE CO., LTD.); TEX twin screw extruder (manufactured by the Japan Steel Works, Ltd.); PCM kneader (manufactured by Ikegai Iron Works Co., Ltd.); Three-roll mill, Mixing roll mill, Kneader (manufactured by Inoue Mfg., Inc.); KNEADEX (manufactured by Mitsui Mining Co., Ltd.); MS-type pressure kneader, Kneader-ruder (manufactured by Moriyama Works); and Banbury mixer (manufactured by Kobe Steel, Ltd.).

It is preferable that the constituent materials of the toner particle are sufficiently mixed using a mixer prior to be provided to the kneading step. Examples of mixers include Henschel mixer (manufactured by Mitsui Mining Co., Ltd.); Super mixer (manufactured by Kawata Mfg. Co., Ltd.); RIBOCONE (manufactured by Okawara Mfg. Co., Ltd.); Nauta mixer, Turbulizer, Cyclomix (manufactured by Hosokawa Micron Corporation); Spiral pin mixer (manufactured by Pacific Machinery & Engineering Co., Ltd.); and Loedige mixer (manufactured by MATSUBO Corporation).

<Pulverization Step>

The pulverization step is a step in which the kneaded product obtained in the above-described kneading step is cooled until the kneaded product becomes to have a hardness capable of being pulverized, and then mechanically pulverized until a desired particle diameter is obtained by a known pulverizer such as a collision plate type jet mill, a fluidized bed type jet mill, or a rotary machine mill. From the perspective of efficiency in pulverization, a fluidized bed type jet mill is preferably used as a pulverizer.

Specific examples of pulverizers include Counter jet mill, Micron jet, and Inomizer (manufactured by Hosokawa Micron Corporation); IDS type mill, PJM jet pulverizer (manufactured by Nippon Pneumatic Mfg. Co., Ltd.); Cross jet mill (manufactured by Kurimoto, Ltd.); ULMAX (manufactured by NISSO ENGINEERING CO., LTD.); SK JET-O-MILL (manufactured by Seishin Enterprise Co., Ltd.); KRYPTRON (manufactured by Kawasaki Heavy Industries, Ltd.); Turbomill (manufactured by Turbo Kogyo Co., Ltd.); and Super rotor (manufactured by Nisshin Engineering Inc.).

<Classification Step>

The classifying step is a step in which the finely pulverized product obtained in the above-described pulverization step is classified to obtain a toner particle having a desired particle diameter distribution.

As a classifier used in the classification, a known apparatus such as an air classifier, an inertial classifier, and a sieve classifier can be used. Specific examples thereof include: Classiel, Micron Classifier, and Spedic Classifier (manufactured by Seishin Enterprise Co., Ltd.); Turbo Classifier (manufactured by Nisshin Engineering Inc.); Micron separator, TurboFlex (ATP), TSP separator (manufactured by Hosokawa Micron Corporation); Elbow-Jet (manufactured by Nittetsu Mining Co., Ltd.), Dispersion Separator (manufactured by Nippon Pneumatic Mfg. Co., Ltd.); and YM MicroCut (manufactured by YASUKAWA CORPORATION).

To the toner particle prepared through each of the above-described steps, an inorganic fine particle such as silica, alumina, titania, or the like, and a resin fine particle such as a vinyl-based resin, a polyester resin, a silicone resin, or the like may be added by applying a shear force in a dry condition if necessary. The inorganic fine particle and the resin fine particle serve as an external additive such as a fluidity improver or a cleaning aid.

Hereinafter, there will be described a method of measuring each physical property related to the present invention.

<Method of Separating Toner Particle from Toner>

When the toner contains an external additive, the external additive is removed from the toner, whereby the toner particle can be separated.

First, 160 g of sucrose (manufactured by Kishida Chemical Co., Ltd.) is added to 100 mL of ion-exchanged water, and is dissolved while being warmed in a hot-water bath to prepare a sucrose concentrated solution.

Subsequently, 31 g of the prepared sucrose concentrated solution and 6 mL of Contaminon N (manufactured by Wako Pure Chemical Industries, Ltd.) are put into a centrifuge tube to prepare a dispersing liquid. Contaminon N, which includes a nonionic surfactant, an anionic surfactant, and an organic builder, is a 10 mass % aqueous solution of a neutral detergent with a pH of 7 for washing precision measurement instruments.

To this dispersing liquid, 1.0 g of toner is added, and a lump of the toner is loosened with a spatula or the like.

Next, the centrifuge tube containing the dispersing liquid to which the toner is added is shaken by a shaker. After shaking, the solution in the centrifuge tube is transferred into a glass tube (50 mL) for a swing rotor, and centrifuged at 3500 rpm for 30 min in a centrifuge. By this operation, the toner particle is separated from the external additive.

After having visually confirmed that the toner particle is sufficiently separated from the aqueous solution, the toner particle is collected and filtered with a reduced pressure filter, and then dried in a dryer for 1 hour or more to remove the external additive from the toner, thereby obtaining a separated toner particle.

<Method of Separating Each Material from Toner Particle>

By utilizing a difference of solubility in a solvent or a difference of specific gravity between the toner particle obtained by the above-described method and each material contained, each material can be separated from the toner particle. Specific examples thereof include the following method.

First separation: The toner particle is dissolved in tetrahydrofuran at 23° C., whereby the soluble content (amorphous resin) is separated from the insoluble contents (crystalline polyester, inorganic fine particle, releasing agent, colorant).

Second separation: The insoluble contents obtained in the first separation is dissolved in toluene at 90° C., whereby the soluble content (crystalline polyester) is separated from the insoluble contents (inorganic fine particle, releasing agent, colorant).

Third separation: The insoluble contents obtained in the second separation is dissolved in hexane at 50° C., whereby the soluble content (releasing agent) is separated from the insoluble contents (inorganic fine particle, colorant).

Fourth separation: The insoluble contents obtained in the third separation is dispersed in tetrahydrofuran, and the centrifugal force is changed in the centrifugal separation method, whereby the inorganic fine particle is separated from the colorant based on the difference in their specific gravities.

<Content Ratio Mr of Resin Component and Content Ratio Mc of Inorganic Fine Particle Contained in Toner Particle>

The soluble content obtained in the first separation is centrifuged, then concentrated and dried, whereby the amount of the binder resin is measured, and the content ratio Mr1 (mass %) of the binder resin in the toner particle is calculated based on the amount of the toner particle used.

The soluble content obtained in the second separation is centrifuged, then concentrated and dried, whereby the amount of the crystalline polyester is measured, and the content ratio Mr2 (mass %) of the crystalline polyester in the toner particle is determined based on the amount of the toner particle used.

From the obtained Mr1 and Mr2, the content ratio Mr (mass %) of the resin component contained in the toner particle can be calculated according to the following formula.

$$Mr=Mr1+Mr2$$

The inorganic fine particle is collected from a liquid after centrifugation in the fourth separation, an amount of the inorganic fine particle is measured, and the content ratio Mc (mass %) of the inorganic fine particle in the toner particle can be calculated based on an amount of the toner particle used.

<Method of Identifying Inorganic Fine Particle>

The inorganic fine particle obtained in the fourth separation can be identified using X-ray powder diffraction (XRD), Infrared spectroscopy (IR), and X-ray fluorescence analysis (XRF).

<Number Average Particle Diameter Dc and Area Average Particle Diameter Da of the Primary Particle of the Inorganic Fine Particle>

The number average particle diameter Dc and the area average particle diameter Da of the primary particle of the inorganic fine particle can be measured using a scanning electron microscope (SEM). As a scanning electron microscope, for example, Scanning electron microscope S-4800 (Hitachi High-Technologies Corporation) can be used.

An example of a specific procedure is shown below.

To about 5 mg of the inorganic fine particle obtained in the fourth separation, there is added 1 ml of ion-exchanged water to which a dispersible surfactant is added, and the mixture is dispersed for 5 minutes by an ultrasonic disperser (an ultrasonic cleaner). Next, one drop of the dispersing liquid described above is dropped on a microgrid (150 mesh) with a support film for SEM, and dried to prepare a measurement sample.

Next, by using SEM under the condition of an acceleration voltage of 2 kV, there acquired an image at a magnification (for example, 50,000 to 150,000 times) at which the inorganic fine particle in the field of view can be sufficiently measured. An area of 100 inorganic fine particles, which are randomly selected from the acquired image, is determined, and a diameter (an equivalent circle diameter) of a circle that has an area equal to the area of the inorganic fine particles is calculated. The value thus obtained is defined as a particle diameter of the primary particle of the inorganic fine particle. From the particle diameters of these 100 inorganic fine particles, the number average particle diameter Dc and the area average particle diameter Da of the primary particle is determined. The particle diameter of the primary particle may be measured manually or using a measurement tool such as image analysis software. Image J (developed by Wayne Rasband) can be used as an image analysis software.

<Area S of the cross section of toner particle, sum of areas ST occupied by inorganic fine particle, sum of areas SA occupied by inorganic fine particle domain A, and sum of areas SB occupied by inorganic fine particle domain B in the cross section of toner particle, and the percentage Pa of number of inorganic fine particle domain A present in a region up to 1.0 μm inside from the contour of the cross section of toner particle>

A cross section of the toner particle is prepared using an argon ion milling apparatus (Trade name E-3500, manufactured by Hitachi High-Technologies Corporation). The cross section of the toner particle is observed using a scanning electron microscope S-4800 (manufactured by Hitachi High-Technologies Corporation) to obtain an image of the cross section of the toner particle. The cross-sectional area of the toner particle is obtained from the image of the cross section of the toner particle, and the diameter (equivalent circle diameter) of a circle that has an area equal to the cross-sectional area is obtained. There are selected 100 images of the cross sections of the toner particles whose equivalent circle diameters are within ±10% of the weight average particle diameter of the toner particles. The sum of the cross-sectional areas of these 100 toner particles is defined as an area S ($\mu m^2$) of the cross section of the toner particle.

For the 100 toner particles described above, the sum of the areas of the inorganic fine particles observed in the cross section of the toner particle is defined as a sum of the areas ST ($\mu m^2$) occupied by the inorganic fine particles in the cross section of the toner particle. Note that, the inorganic fine particle in the cross-sectional image is identified using an energy dispersive X-ray spectrometer (EDX) or the like.

For the 100 toner particles described above, the sum of the areas of the inorganic fine particle domain A observed in the cross section of the toner particle is defined as a sum ($\mu m^2$) of the areas SA occupied by the inorganic fine particle domain A in the cross section of the toner particle.

For the 100 toner particles described above, when the total number of the observed inorganic fine particle domain A is denoted by P1 (pieces), the number of the inorganic fine particle domain A present in a region up to 1.0 μm inside from the contour of the cross section of the toner particle is denoted by P2 (pieces), Pa is determined by a formula of Pa=P2/P1. At this time, in a case where at least a part of the inorganic fine particle domain A is present in the region up to 1.0 μm inside from the contour of the cross section of the toner particle, the inorganic fine particle domain A is regarded to be present in the region up to 1.0 μm inside from the contour of the cross section of the toner particle.

For the 100 toner particles described above, the sum of the areas of the inorganic fine particle domain B observed in the cross section of the toner particle is defined as a sum ($\mu m^2$) of the areas SB occupied by the inorganic fine particle domain B in the cross section of the toner particle.

Note that, in a case where the inorganic fine particle, the inorganic fine particle domain A, and the inorganic fine particle domain B observed in the cross section of the toner particle have a non-spherical shape, their dispersion diameters should be defined as their equivalent circle diameters.

<Number Average Value Dd of Dispersion Diameters of Inorganic Fine Particles in Cross Section of Toner Particle, Maximum Value (Ddmax) of Dispersion Diameters of Inorganic Fine Particles in Cross Section of Toner Particle>

For the 100 toner particles described above, the number average value Dd and the maximum value Ddmax of the dispersion diameters are determined from the dispersion diameters (equivalent circle diameter) of the inorganic fine particles observed in the cross section of the toner particle.

<Content Ratio Er (Mass %) of Ester Group in Resin Component>

The content ratio Er (mass %) of an ester group in the resin component is a value obtained by summing up the content ratios of respective ester groups in the binder resin and in the crystalline polyester by taking into consideration of the content ratios of the binder resin and the crystalline polyester in the toner particle. A specific determining method is as follows.

The soluble content in the first separation is centrifuged, and then concentrated and dried, thereby separating the binder resin. The content ratio Er1 (mass %) of an ester group in the separated binder resin is measured by the nuclear magnetic resonance spectroscopy (NMR).

The soluble content in the second separation is centrifuged, and then concentrated and dried, thereby separating the crystalline polyester. The content ratio Er2 (mass %) of an ester group of the separated crystalline polyester is measured by the nuclear magnetic resonance spectroscopy (NMR).

Furthermore, the content ratio Er (mass %) of an ester group in the resin component is calculated according to the following formula.

$$Er=(Er1\times Mr1)/Mr+(Er2\times Mr2)/Mr$$

<Sum of Areas SP Occupied by Colorant in Cross Section of Toner Particle, Sum of Areas SC Occupied by Colorant Contained in Inorganic Fine Particle Domain a and Inorganic Fine Particle Domain B>

For the cross section of the toner particle obtained by the argon ion milling apparatus as described above, a mapping image for an element unique to the colorant is obtained using an energy dispersive X-ray spectrometer (EDX). From the image obtained by this, SP and SC can be determined.

An element mapping is conducted using EDX for the 100 toner particles as described above. A projected area is calculated for an element unique to the colorant, and the sum of the projected areas in 100 toner particles is denoted by SP ($\mu m^2$).

In addition, for the 100 toner particles described above, the projected area is calculated for the element unique to the colorant in a region where the inorganic fine particle domain A and the inorganic fine particle domain B are present, and the sum of the projected areas in the 100 toner particles is denoted by SC ($\mu m^2$).

As for an element to be mapped, there should be selected and measured an element that is not included in the inorganic fine particle or other constituent components in order to distinguish the colorant from the inorganic fine particle or other constituent components, or a plurality of elements may be mapped but thereafter the colorant should be measured by subtracting the amount attributed to the inorganic fine particle and other constituent components.

An image analysis software can be used to calculate the projected area. A binarization or a threshold setting can be made to enclose the contour of the projection area in the visual field. By the analysis of the obtained contour image, the projection area can be calculated. Note that, as an image analysis software, Image J (developed by Wayne Rasband) can be used.

According to the present invention, there can be provided a toner that has a high level of hot offset resistance and an excellent abrasion resistance on an image where a toner laid-on level is low.

EXAMPLES

In the following examples, the number of parts is on a mass basis.

<Production of Inorganic Fine Particle Kneaded Product 1 (Inorganic Fine Particle Pre-Kneading Step)>

$CaCO_3$ particle 1: 35 parts by mass (Precipitated calcium carbonate particle: Dc=400 nm, Da/Dc=1.2, the content ratio of $CaCO_3$=100%)

Colorant 1: 35 parts by mass (Cyan pigment: Pigment Blue 15:3, the volume average particle diameter: 102 nm)

Polyester resin 1 (PEsR-1) as a binder resin A: 30 parts by mass (Composition (mol %) [Polyoxypropylene(2.2)-2,2-bis(4-hydroxyphenyl)propane: isophthalic acid: terephthalic acid=100:50:50], the weight-average molecular weight=10100)

The above materials were mixed using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. at a screw rotation speed of 200 rpm and a discharge temperature of 130° C. The resultant kneaded product was cooled and coarsely pulverized with a pin mill to a volume average particle diameter of 100 μm or less to obtain a coarsely crushed product of the inorganic fine particle kneaded product 1.

<Production of Inorganic Fine Particle Kneaded Products 2 to 28>

Inorganic fine particle kneaded products 2 to 28 were produced under the same conditions as in the production of the inorganic fine particle kneaded product 1 except that the materials used and the operating conditions of the twin-screw extruder were changed as shown in Table 1.

TABLE 1

| Inorganic fine particle kneaded product No. | Material: Binder resin A: Type | Material: Binder resin A: Amount (part) | Material: Colorant 1: Amount (part) | Material: Inorganic fine particle: Type | Material: Inorganic fine particle: Amount (part) | Operating condition: Temperature ° C. | Operating condition: Rotation speed rpm |
|---|---|---|---|---|---|---|---|
| 1 | PEsR-1 | 30.0 | 35.0 | $CaCO_3$ particle 1 | 35.0 | 130 | 200 |
| 2 | PEsR-1 | 30.0 | 26.5 | $CaCO_3$ particle 1 | 43.5 | 130 | 200 |
| 3 | PEsR-1 | 30.0 | — | $CaCO_3$ particle 1 | 70.0 | 130 | 200 |
| 4 | PEsR-1 | 30.0 | 26.5 | $CaCO_3$ particle 1 | 43.5 | 130 | 80 |
| 5 | PEsR-1 | 30.0 | 26.5 | $CaCO_3$ particle 1 | 43.5 | 130 | 120 |
| 6 | PEsR-1 | 30.0 | 26.5 | $CaCO_3$ particle 1 | 43.5 | 140 | 300 |
| 7 | PEsR-1 | 30.0 | 26.5 | $CaCO_3$ particle 1 | 43.5 | 140 | 350 |
| 8 | SAR-1 | 30.0 | 26.5 | $CaCO_3$ particle 1 | 43.5 | 130 | 200 |
| 9 | SAR-2 | 30.0 | 26.5 | $CaCO_3$ particle 1 | 43.5 | 130 | 200 |
| 10 | PEsR-1 | 30.0 | 26.5 | $CaCO_3$ particle 2 | 43.5 | 130 | 200 |
| 11 | PEsR-1 | 30.0 | 26.5 | $CaCO_3$ particle 3 | 43.5 | 130 | 200 |
| 12 | PEsR-1 | 30.0 | 26.5 | $CaCO_3$ particle 4 | 43.5 | 130 | 200 |
| 13 | PEsR-1 | 30.0 | 26.5 | $CaCO_3$ particle 5 | 43.5 | 130 | 200 |
| 14 | PEsR-1 | 30.0 | 26.5 | $CaCO_3$ particle 6 | 43.5 | 130 | 200 |
| 15 | PEsR-1 | 30.0 | 26.5 | $CaCO_3$ particle 7 | 43.5 | 130 | 200 |
| 16 | PEsR-2 | 30.0 | 26.5 | $CaCO_3$ particle 1 | 43.5 | 140 | 200 |
| 17 | PEsR-3 | 30.0 | 26.5 | $CaCO_3$ particle 1 | 43.5 | 150 | 200 |
| 18 | PEsR-1 | 30.0 | 26.5 | $Al_2Si_2O_5(OH)_4$ particle 1 | 43.5 | 130 | 200 |
| 19 | PEsR-1 | 30.0 | 26.5 | $Mg_3Si_4O_{10}(OH)_2$ particle 1 | 43.5 | 130 | 200 |
| 20 | PEsR-1 | 30.0 | 26.5 | $BaSO_4$ particle 1 | 43.5 | 130 | 200 |
| 21 | PEsR-1 | 30.0 | 26.5 | $CaCO_3$ particle 8 | 43.5 | 130 | 200 |
| 22 | PEsR-1 | 30.0 | 17.5 | $CaCO_3$ particle 1 | 52.5 | 130 | 200 |
| 23 | PEsR-1 | 30.0 | 16.8 | $CaCO_3$ particle 1 | 53.2 | 130 | 200 |
| 24 | PEsR-1 | 30.0 | 10.7 | $CaCO_3$ particle 1 | 59.3 | 130 | 200 |
| 25 | PEsR-1 | 30.0 | 10.7 | $CaCO_3$ particle 1 | 59.3 | 130 | 200 |
| 26 | PEsR-1 | 30.0 | 10.4 | $CaCO_3$ particle 1 | 59.6 | 130 | 200 |

TABLE 1-continued

| Inorganic fine particle kneaded product No. | Material Binder resin A Type | Amount (part) | Colorant 1 Amount (part) | Inorganic fine particle Type | Amount (part) | Operating condition Temperature ° C. | Rotation speed rpm |
|---|---|---|---|---|---|---|---|
| 27 | PEsR-1 | 30.0 | 26.5 | $CaCO_3$ particle 9 | 43.5 | 150 | 200 |
| 28 | PEsR-1 | 30.0 | 26.5 | $CaCO_3$ particle 10 | 43.5 | 120 | 200 |

Details of each material described in Table 1 are as follows.

Polyester resin 2 (PEsR-2):

(Composition (mol %) [Polyoxypropylene(2.2)-2,2-bis(4-hydroxyphenyl)propane: isophthalic acid: terephthalic acid=100:50:50], the weight-average molecular weight=21000)

Polyester resin 3 (PEsR-3):

(Composition (mol %) [Polyoxypropylene(2.2)-2,2-bis(4-hydroxyphenyl)propane: isophthalic acid: terephthalic acid=100:50:50], the weight-average molecular weight=33000)

Styrene acrylic resin 1 (SAR-1):

(Composition (mol %) [styrene: n-butyl acrylate=92:8], the weight average molecular weight=26000)

Styrene acrylic resin 2 (SAR-2):

(Composition (mol %) [styrene: n-butyl acrylate=77:23], the weight average molecular weight=25000)

$CaCO_3$ particle 2:

(Precipitated calcium carbonate particle, Dc=150 nm, Da/Dc=1.2, the content ratio of $CaCO_3$=100%)

$CaCO_3$ particle 3:

(Precipitated calcium carbonate particle, Dc=300 nm, Da/Dc=1.2, the content ratio of $CaCO_3$=100%)

$CaCO_3$ particle 4:

(Ground calcium carbonate particle, Dc=700 nm, Da/Dc=1.2, the content ratio of $CaCO_3$=100%)

$CaCO_3$ particle 5:

(Ground calcium carbonate particle, Dc=900 nm, Da/Dc=1.2, the content ratio of $CaCO_3$=100%)

$CaCO_3$ particle 6:

(Precipitated calcium carbonate particle, Dc=400 nm, Da/Dc=1.4, the content ratio of $CaCO_3$=100%)

$CaCO_3$ particle 7:

(Precipitated calcium carbonate particle, Dc=400 nm, Da/Dc=1.6, the content ratio of $CaCO_3$=100%)

$CaCO_3$ particle 8:

(Fatty acid surface-treated precipitated calcium carbonate particle, Dc=400 nm, Da/Dc=1.2, the content ratio of $CaCO_3$=99%.

Water adjusted to 70° C. was added to the $CaCO_3$ particle 1 so that the solid content became 10 mass %, and the mixture was made to be a slurry using an agitation type disperser. While 1 kg of the slurry of calcium carbonate was stirred by the disperser, 0.5 g of saponified stearic acid was added thereto, the mixture was stirred for 30 minutes, then press-dehydrated. The resultant dehydrated cake was dried and then pulverized to obtain the calcium carbonate 8.

$CaCO_3$ particle 9:

(Precipitated calcium carbonate particle, Dc=50 nm, Da/Dc=1.2, the content ratio of $CaCO_3$=100%)

$CaCO_3$ particle 10:

(Ground calcium carbonate particle, Dc=1100 nm, Da/Dc=1.2, the content ratio of $CaCO_3$=100%)

$Al_2Si_2O_5(OH)_4$ particle 1:

(Kaolin particle, Dc=400 nm, Da/Dc=1.2, the content ratio of $Al_2Si_{205}(OH)_{4=99}$%)

$Mg_3Si_4O_{10}(OH)_2$ particle 1:

(Talc particle, Dc=1000 nm, Da/Dc=1.2, the content ratio of $Mg_3Si_{4011})(OH)_{2=100}$%)

$BaSO_4$ particle 1:

(Barium sulfate particle, Dc=500 nm, Da/Dc=1.2, the content ratio of $BaSO_4$=99%)

Example 1

| (Production example of toner 1) | |
|---|---|
| Polyester resin A (PEsR-A) as a binder resin B (Composition (mol %) [Polyoxypropylene(2.2)-2,2-bis(4-hydroxyphenyl)propane:isophthalic acid:terephthalic acid = 100:50:50], the weight average molecular weight = 50500) | 75.3 parts by mass |
| Inorganic fine particle kneaded product 1 | 17.7 parts by mass |
| Crystalline polyester 1 (Composition (mol %) [1,6 hexanediol: dodecanedioic acid = 100:100], the melting point = 72° C.) | 2.0 parts by mass |
| Hydrocarbon wax 1 | 5.0 parts by mass |

(Peak Temperature of the Highest Endothermic Peak: 90° C.)

The above materials were mixed by Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. at a screw rotation speed of 200 rpm and a discharge temperature of 130° C. The resultant kneaded product was cooled and coarsely pulverized with a pin mill until it has a volume average particle diameter of 100 μm or less, and thus a coarsely pulverized product was obtained.

The resultant coarsely crushed product was finely pulverized by a mechanical pulverizer (T-250, manufactured by Turbo Kogyo Co., Ltd.) with an adjustment of the rotation speed and the number of passes so that the resultant coarsely crushed product had a target particle diameter. Furthermore, the finely pulverized product was classified using a rotary classifier (200TSP, manufactured by Hosokawa Micron Corporation) to obtain the toner particle 1. As for the operating conditions of the rotary classifier (200TSP, manufactured by Hosokawa Micron Corporation), the classification was conducted with an adjustment of the rotation speed so as to obtain the target particle diameter and the particle diameter distribution.

To 100 parts by mass of the resultant toner particle were added 1.8 parts by mass of silica fine particle that had been hydrophobized with silicone oil, and the mixture was mixed with Henschel mixer (Trade name: FM-75 type, manufactured by Mitsui Mining Co., Ltd.), and thus the toner 1 was obtained. The silica fine particle used had a specific surface area of 200 $m^2/g$ as determined by the BET method. In addition, the mixing conditions of the Henschel mixer were a rotation speed of 30 $s^{-1}$ and a rotation time of 10 min.

The weight average particle diameter of the toner particle 1 was 6.7 μm.

Examples 2, 5 to 8, 13 to 33, and 37 to 43, Comparative Examples 1 and 3 to 6

Production Examples of Toners 2, 5 to 8, 13 to 33, 37 to 44, and 46 to 49

In the production example of the toner 1, the materials to be used and the operating conditions for the twin screw extruder were changed as shown in Table 2. Except for that, toners 2, 5 to 10, 13 to 33, 37 to 44, and 46 to 49 were produced under the same conditions as in the production example of the toner 1.

Example 3

| (Production of the polyester resin dispersing liquid 1) | |
|---|---|
| Tetrahydrofuran (manufactured by Wako Pure Chemical Industries, Ltd.) | 200 parts by mass |
| Polyester resin 1 (PEsR-1) | 120 parts by mass |
| Anionic surfactant (Tradename: NEOGEN RK, manufactured by DKS Co., Ltd.) | 0.6 parts by mass |

The above-described materials were mixed and then stirred for 12 hours to dissolve the resin.

Then, 2.7 parts by mass of N,N-dimethylaminoethanol was added thereto, and the mixture was stirred at 4000 rpm using an ultra-high speed stirrer T. K. ROBOMIX (manufactured by PRIMIX Corporation).

Furthermore, 359.4 parts by mass of ion-exchanged water was added at a rate of 1 g/min, and thus a resin fine particle was precipitated. Thereafter, tetrahydrofuran was removed using an evaporator, thereby obtaining the polyester resin dispersing liquid 1.

| (Production of the polyester resin dispersing liquid 2) | |
|---|---|
| Tetrahydrofuran (manufactured by Wako Pure Chemical Industries, Ltd.) | 200 parts by mass |
| Polyester resin A (PEsR-A) | 120 parts by mass |
| Anionic surfactant (Trade name: Neogen RK, manufactured by DKS Co., Ltd.) | 0.6 parts by mass |

The above-described materials were mixed and then stirred for 12 hours to dissolve the resin.

Then, 2.7 parts by mass of N,N-dimethylaminoethanol was added thereto, and the mixture was stirred at 4000 rpm using an ultra-high speed stirrer T. K. ROBOMIX (manufactured by PRIMIX Corporation).

Furthermore, 359.4 parts by mass of ion-exchanged water was added at a rate of 1 g/min, and thus a resin fine particle was precipitated. Thereafter, tetrahydrofuran was removed using an evaporator, thereby obtaining a polyester resin dispersing liquid 2.

| (Production of crystalline polyester resin dispersing liquid 1) | |
|---|---|
| Tetrahydrofuran (manufactured by Wako Pure Chemical Industries, Ltd.) | 200 parts by mass |
| Crystalline polyester resin 1 | 40 parts by mass |
| Anionic surfactant (Trade name: Neogen RK, manufactured by DKS Co., Ltd.) | 0.6 parts by mass |

The above-described materials were mixed and then stirred at 50° C. for 3 hours to dissolve the resin.

Then, 1.0 parts by mass of N,N-dimethylaminoethanol was added thereto, and the mixture was stirred at 4000 rpm using an ultra-high speed stirrer T. K. ROBOMIX (manufactured by PRIMIX Corporation).

Furthermore, 359.4 parts by mass of ion-exchanged water was added at a rate of 1 g/min, and thus a resin fine particle was precipitated. Thereafter, tetrahydrofuran was removed using an evaporator, thereby obtaining the crystalline polyester resin dispersing liquid 1.

| (Production of colorant dispersing liquid 1) | |
|---|---|
| Colorant 1 | 100 parts by mass |
| Anionic surfactant (Trade name: Neogen RK, manufactured by DKS Co., Ltd.) | 10 parts by mass |
| Ion exchange water | 890 parts by mass |

The above-described materials were mixed and stirred at 7000 rpm using an ultra-high speed stirrer T. K. Robomix (manufactured by PRIMIX Corporation). Furthermore, the mixture was dispersed by using a high pressure impact type disperser Nanomizer (manufactured by YOSHIDA KIKAI CO., LTD.) at a pressure of 200 MPa, thereby preparing the colorant dispersing liquid 1.

| (Production of releasing agent dispersing liquid 1) | |
|---|---|
| Hydrocarbon wax 1 | 20.0 parts by mass |
| Anionic surfactant (Trade name: Neogen RK, manufactured by DKS Co., Ltd.) | 1.0 parts by mass |
| Ion exchange water | 79.0 parts by mass |

The above-described materials were put into a mixing vessel equipped with a stirring device, then heated to 90° C., stirred while circulating to CLEARMIX W-Motion (manufactured by M Technique Co., Ltd.), and then dispersed for 60 minutes. Note that, the stirring was conducted under the conditions of a rotor rotation speed of 19000 rpm and a screen rotation speed of 19000 rpm at a shear stirring site with a rotor outer diameter of 3 cm and a clearance of 0.3 mm.

Thereafter, the mixture was cooled to 40° C. under cooling treatment conditions of a rotor rotation speed of 1000 rpm, a screen rotation speed of 0 rpm, and a cooling rate of 10° C./min, thereby obtaining the releasing agent dispersing liquid 1.

| (Production of inorganic fine particle dispersing liquid 1) | |
|---|---|
| $CaCO_3$ particle 1 | 100 parts by mass |
| Anionic surfactant (Trade name: Neogen RK, | 10 parts by mass |

-continued

| (Production of inorganic fine particle dispersing liquid 1) | |
|---|---|
| manufactured by DKS Co., Ltd.) | |
| Ion exchange water | 890 parts by mass |

The above-described materials were mixed and stirred at 7000 rpm using an ultra-high speed stirrer T. K. Robomix (manufactured by PRIMIX Corporation). Furthermore, the mixture was dispersed at a pressure of 200 MPa by using a high pressure impact type disperser Nanomizer (manufactured by YOSHIDA KIKAI CO., LTD.), thereby preparing the inorganic fine particle dispersing liquid 1.

| (Production of toner 3) | |
|---|---|
| Polyester resin dispersing liquid 1 | 28 parts by mass |
| Inorganic fine particle dispersing liquid 1 | 102 parts by mass |
| Colorant dispersing liquid 1 | 62 parts by mass |
| Ion exchange water | 485 parts by mass |

The above-described materials were put into a round stainless steel flask and mixed, then 80 parts by mass of 2% magnesium sulfate aqueous solution was added thereto, and the mixture was dispersed using a homogenizer (Trade name: Ultra Turrax T50, manufactured by IKA) at 5000 rpm for 10 minutes.

Thereafter, the mixture was heated to 40° C. in a water bath for heating with a stirring blade while appropriately adjusting the rotation speed at which the mixed liquid was stirred. When the mixed liquid reached 40° C., a mixture of 278 parts by mass of the polyester resin dispersing liquid 2, 25 parts by mass of the releasing agent dispersing liquid 1, and 20 parts by mass of the crystalline polyester resin dispersing liquid 1 were added thereto. Thereafter, the mixed liquid was heated to 58° C. while appropriately adjusting the rotation speed so that the mixed liquid was stirred. The mixed liquid was held at 58° C. for 1 hour, thereby obtaining an aggregated particle.

To the dispersing liquid containing the resultant aggregated particle, 320 parts by mass of 5% trisodium citrate aqueous solution was added and then heated to 95° C.

The heated liquid was held at 95° C. for 2 hours, and then cooled to 25° C. while stirring was continued, thereby obtaining a toner particle dispersing liquid.

Thereafter, the toner particle dispersing liquid was filtrated and solid-liquid separated, then the filtrate was sufficiently washed with ion-exchanged water and dried using a vacuum dryer, thereby obtaining the toner particle 3. To 100 parts by mass of the resultant toner particle were added 1.8 parts by mass of a silica fine particle that had been hydrophobized with silicone oil, and the mixture was mixed with Henschel mixer (FM-75 type, manufactured by Mitsui Mining Co., Ltd.) at a rotation speed of 30 $s^{-1}$ and a rotation time of 10 min, thereby obtaining the toner 3. Note that, the used silica fine particle that had been hydrophobized had a specific surface area of 200 $m^2/g$ as measured by the BET method.

Example 4

| (Production example of toner 4) The kneading step in Example 1 was changed as follows. | |
|---|---|
| Polyester resin A (PEsR-A) as a binder resin B | 71.1 parts by mass |
| Inorganic fine particle kneaded product 3 | 15.7 parts by mass |
| Crystalline polyester 1 | 2.0 parts by mass |
| Hydrocarbon wax 1 | 5.0 parts by mass |
| Colorant 1 | 6.2 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 200 rpm and a discharge temperature of 130° C.

Except for that, toner 4 was obtained in the same manner as in Example 1.

Example 9

The kneading step in Example 1 was changed as follows.

| | |
|---|---|
| Styrene acrylic resin A (SAR-A) as a binder resin B (Composition (mol %) [styrene:n-butyl acrylate = 92:8], the weight average molecular weight = 51000): | 69.7 parts by mass |
| Inorganic fine particle kneaded product 8 | 23.3 parts by mass |
| Crystalline polyester 1 | 2.0 parts by mass |
| Hydrocarbon wax 1 | 5.0 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 200 rpm and a discharge temperature of 130° C.

Except for that, a toner 9 was obtained in the same manner as in Example 1.

Example 10

The kneading step in Example 1 was changed as follows.

| | |
|---|---|
| Styrene acrylic resin B (SAR-B) as a binder resin B (Composition (mol %) [styrene:n-butyl acrylate = 77:23], the weight average molecular weight = 50,000): | 69.7 parts by mass |
| Inorganic fine particle kneaded product 9 | 23.3 parts by mass |
| Crystalline polyester 1 | 2.0 parts by mass |
| Hydrocarbon wax 1 | 5.0 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 200 rpm and a discharge temperature of 130° C.

Hereinafter, the toner 10 was obtained in the same manner as in Example 1 except for the above.

Example 11

| (Production example of toner 11) The kneading step in Example 1 was changed as follows. | |
|---|---|
| Polyester resin A (PEsR-A) as a binder resin B | 77.0 parts by mass |
| Inorganic fine particle kneaded product 1 | 15.1 parts by mass |
| Crystalline polyester 1 | 2.0 parts by mass |
| Hydrocarbon wax 1 | 5.0 parts by mass |
| Colorant 1 | 0.9 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 200 rpm and a discharge temperature of 130° C.

The toner 11 was obtained in the same manner as in Example 1 except for the above.

Example 12

| (Production example of toner 12) The kneading step in Example 1 was changed as follows. | |
|---|---|
| Polyester resin A (PEsR-A) as a binder resin B | 78.1 parts by mass |
| Inorganic fine particle kneaded product 1 | 13.4 parts by mass |
| Crystalline polyester 1 | 2.0 parts by mass |
| Hydrocarbon wax 1 | 5.0 parts by mass |
| Colorant 1 | 1.5 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 200 rpm and a discharge temperature of 130° C.

The toner 12 was obtained in the same manner as in Example 1 except for the above.

Example 34

| (Production example of toner 34) The kneading step in Example 1 was changed as follows. | |
|---|---|
| Styrene acrylic resin B (SAR-B) as a binder resin B | 79.0 parts by mass |
| Inorganic fine particle kneaded product 9 | 10.6 parts by mass |
| Crystalline polyester 1 | 2.0 parts by mass |
| Hydrocarbon wax 1 | 5.0 parts by mass |
| Colorant 1 | 3.4 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 150° C. with a screw rotation speed of 200 rpm and a discharge temperature of 150° C.

A toner 34 was obtained in the same manner as in Example 1 except for the above.

Example 35

| (Production example of toner 35) The kneading step in Example 1 was changed as follows. | |
|---|---|
| Styrene acrylic resin B (SAR-B) as a binder resin B | 80.4 parts by mass |
| Inorganic fine particle kneaded product 9 | 8.7 parts by mass |
| Crystalline polyester 1 | 2.0 parts by mass |
| Hydrocarbon wax 1 | 5.0 parts by mass |
| Colorant 1 | 3.9 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 140° C. with a screw rotation speed of 200 rpm and a discharge temperature of 140° C.

The toner 35 was obtained in the same manner as in Example 1 except for the above.

Example 36

| (Production Example of Toner 36) The kneading step in Example 1 was changed as follows. | |
|---|---|
| Styrene acrylic resin A (SAR-A) as a binder resin B | 82.4 parts by mass |
| Inorganic fine particle kneaded product 8 | 6.2 parts by mass |
| Crystalline polyester 1 | 2.0 parts by mass |
| Hydrocarbon wax 1 | 5.0 parts by mass |
| Colorant 1 | 4.4 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 200 rpm and a discharge temperature of 130° C.

Hereinafter, a toner 36 was obtained in the same manner as in Example 1.

Comparative Example 2

| (Production Example of Toner 45) The kneading step in Example 1 was changed as follows. | |
|---|---|
| Polyester resin A (PEsR-A) as a binder resin B | 84.3 parts by mass |
| Inorganic fine particle kneaded product 2 | 3.4 parts by mass |
| Crystalline polyester 1 | 2.0 parts by mass |
| Hydrocarbon wax 1 | 5.0 parts by mass |
| Colorant 1 | 5.3 parts by mass |

The above-described materials were mixed by using Henschel mixer (FM-75 type, manufactured by Mitsui Mining Co., Ltd.) at a rotation speed of 20 $s^{-1}$ and a rotation time of 5 min. Thereafter, the mixture was kneaded with a twin screw extruder (PCM-30 model, manufactured by Ikegai Corporation) set at 130° C. with a screw rotation speed of 150 rpm and a discharge temperature of 130° C.

The toner 45 was obtained in the same manner as in Example 1 except for the above.

TABLE 2

| Example/ Comparative Example | Toner No. | Material: Inorganic fine particle kneaded product Type (No.) | Inorganic fine particle kneaded product Amount (part) | Binder resin B Type | Binder resin B Amount (part) | Crystalline polyester 1 Amount (part) | Hydrocarbon wax 1 (Release agent) Amount (part) | Colorant 1 Amount (part) | Operating condition: Temper-ature (° C.) | Operating condition: Rotation speed (rpm) |
|---|---|---|---|---|---|---|---|---|---|---|
| Example 1 | 1 | 1 | 17.7 | PEs-A | 75.3 | 2.0 | 5.0 | — | 130 | 200 |
| Example 2 | 2 | 2 | 23.3 | PEs-A | 69.7 | 2.0 | 5.0 | — | 130 | 200 |
| Example 4 | 4 | 3 | 15.7 | PEs-A | 71.1 | 2.0 | 5.0 | 6.2 | 130 | 200 |
| Example 5 | 5 | 4 | 23.3 | PEs-A | 69.7 | 2.0 | 5.0 | — | 130 | 200 |
| Example 6 | 6 | 5 | 23.3 | PEs-A | 69.7 | 2.0 | 5.0 | — | 130 | 200 |
| Example 7 | 7 | 6 | 23.3 | PEs-A | 69.7 | 2.0 | 5.0 | — | 130 | 200 |
| Example 8 | 8 | 7 | 23.3 | PEs-A | 69.7 | 2.0 | 5.0 | — | 130 | 200 |
| Example 9 | 9 | 8 | 23.3 | SAR-A | 69.7 | 2.0 | 5.0 | — | 130 | 200 |
| Example 10 | 10 | 9 | 23.3 | SAR-B | 69.7 | 2.0 | 5.0 | — | 130 | 200 |
| Example 11 | 11 | 1 | 15.1 | PEs-A | 77.0 | 2.0 | 5.0 | 0.9 | 130 | 200 |
| Example 12 | 12 | 1 | 13.4 | PEs-A | 78.1 | 2.0 | 5.0 | 1.5 | 130 | 200 |
| Example 13 | 13 | 2 | 23.3 | PEs-A | 71.7 | — | 5.0 | — | 130 | 200 |
| Example 14 | 14 | 2 | 23.3 | PEs-A | 61.7 | 10.0 | 5.0 | — | 130 | 200 |
| Example 15 | 15 | 10 | 23.3 | PEs-A | 69.7 | 2.0 | 5.0 | — | 130 | 200 |
| Example 16 | 16 | 11 | 23.3 | PEs-A | 69.7 | 2.0 | 5.0 | — | 130 | 200 |
| Example 17 | 17 | 12 | 23.3 | PEs-A | 69.7 | 2.0 | 5.0 | — | 130 | 200 |
| Example 18 | 18 | 13 | 23.3 | PEs-A | 69.7 | 2.0 | 5.0 | — | 130 | 200 |
| Example 19 | 19 | 14 | 23.3 | PEs-A | 69.7 | 2.0 | 5.0 | — | 130 | 200 |
| Example 20 | 20 | 15 | 23.3 | PEs-A | 69.7 | 2.0 | 5.0 | — | 130 | 200 |
| Example 21 | 21 | 16 | 23.3 | PEs-A | 69.7 | 2.0 | 5.0 | — | 130 | 200 |
| Example 22 | 22 | 17 | 23.3 | PEs-A | 69.7 | 2.0 | 5.0 | — | 130 | 200 |
| Example 23 | 23 | 10 | 23.3 | PEs-A | 69.7 | 2.0 | 5.0 | — | 130 | 300 |
| Example 24 | 24 | 13 | 23.3 | PEs-A | 69.7 | 2.0 | 5.0 | — | 130 | 120 |
| Example 25 | 25 | 13 | 23.3 | PEs-A | 69.7 | 2.0 | 5.0 | — | 130 | 80 |
| Example 26 | 26 | 18 | 23.3 | PEs-A | 69.7 | 2.0 | 5.0 | — | 130 | 200 |
| Example 27 | 27 | 19 | 23.3 | PEs-A | 69.7 | 2.0 | 5.0 | — | 130 | 200 |
| Example 28 | 28 | 20 | 23.3 | PEs-A | 69.7 | 2.0 | 5.0 | — | 130 | 200 |
| Example 29 | 29 | 2 | 23.3 | PEs-A | 69.7 | 2.0 | 5.0 | — | 170 | 200 |
| Example 30 | 30 | 2 | 23.3 | PEs-A | 69.7 | 2.0 | 5.0 | — | 150 | 200 |
| Example 31 | 31 | 2 | 23.3 | PEs-A | 69.7 | 2.0 | 5.0 | — | 140 | 200 |
| Example 32 | 32 | 2 | 23.3 | PEs-A | 69.7 | 2.0 | 5.0 | — | 130 | 100 |
| Example 33 | 33 | 21 | 23.3 | PEs-A | 69.7 | 2.0 | 5.0 | — | 130 | 200 |
| Example 34 | 34 | 9 | 10.6 | SAR-B | 79.0 | 2.0 | 5.0 | 3.4 | 150 | 200 |
| Example 35 | 35 | 9 | 8.7 | SAR-B | 80.4 | 2.0 | 5.0 | 3.9 | 140 | 200 |

TABLE 2-continued

| Example/ Comparative Example | Toner No. | Inorganic fine particle kneaded product Type (No.) | Inorganic fine particle kneaded product Amount (part) | Binder resin B Type | Binder resin B Amount (part) | Crystalline polyester 1 Amount (part) | Hydrocarbon wax 1 (Release agent) Amount (part) | Colorant 1 Amount (part) | Operating condition Temper-ature (° C.) | Operating condition Rotation speed (rpm) |
|---|---|---|---|---|---|---|---|---|---|---|
| Example 36 | 36 | 8 | 6.2 | SAR-A | 82.4 | 2.0 | 5.0 | 4.4 | 130 | 200 |
| Example 37 | 37 | 22 | 35.7 | PEs-A | 57.3 | 2.0 | 5.0 | — | 140 | 200 |
| Example 38 | 38 | 22 | 35.7 | PEs-A | 57.3 | 2.0 | 5.0 | — | 130 | 200 |
| Example 39 | 39 | 22 | 35.7 | PEs-A | 57.3 | 2.0 | 5.0 | — | 120 | 200 |
| Example 40 | 40 | 22 | 35.7 | PEs-A | 57.3 | 2.0 | 5.0 | — | 130 | 100 |
| Example 41 | 41 | 23 | 36.7 | PEs-A | 56.3 | 2.0 | 5.0 | — | 145 | 200 |
| Example 42 | 42 | 24 | 57.7 | PEs-A | 35.3 | 2.0 | 5.0 | — | 150 | 200 |
| Example 43 | 43 | 24 | 57.7 | PEs-A | 35.3 | 2.0 | 5.0 | — | 130 | 200 |
| Comparative Example 1 | 44 | 2 | 23.3 | PEs-A | 69.7 | 2.0 | 5.0 | — | 180 | 400 |
| Comparative Example 2 | 45 | 2 | 3.4 | PEs-A | 84.3 | 2.0 | 5.0 | 5.3 | 130 | 150 |
| Comparative Example 3 | 46 | 25 | 57.7 | PEs-A | 35.3 | 2.0 | 5.0 | — | 110 | 200 |
| Comparative Example 4 | 47 | 26 | 60.0 | PEs-A | 33.0 | 2.0 | 5.0 | — | 140 | 200 |
| Comparative Example 5 | 48 | 27 | 23.3 | PEs-A | 69.7 | 2.0 | 5.0 | — | 130 | 200 |
| Comparative Example 6 | 49 | 28 | 23.3 | PEs-A | 69.7 | 2.0 | 5.0 | — | 130 | 200 |

The types of materials used for the toner 1 to 49 according to Example 1 to 43 and Comparative Example 1 to 6 and the content ratios of the materials in the toners are collectively shown in Table 3.

TABLE 3

| Example/ Comparative Example | Toner No. | Binder resin Type | Binder resin Amount (mass %) | Binder resin Type | Binder resin Amount (mass %) | Crystalline polyester 1 Amount (mass%) | Inorganic fine particle Type | Inorganic fine particle Amount (mass %) | Colorant 1 Amount (mass %) | Hydrocarbon wax (Release agent) Amount (mass %) |
|---|---|---|---|---|---|---|---|---|---|---|
| Example 1 | 1 | PEsR-1 | 5.3 | PEsR-A | 75.3 | 2.0 | $CaCO_3$ particle 1 | 6.2 | 6.2 | 5.0 |
| Example 2 | 2 | PEsR-1 | 7.0 | PEsR-A | 69.7 | 2.0 | $CaCO_3$ particle 1 | 10.2 | 6.2 | 5.0 |
| Example 3 | 3 | PEsR-1 | 7.0 | PEsR-A | 69.7 | 2.0 | $CaCO_3$ particle 1 | 10.2 | 6.2 | 5.0 |
| Example 4 | 4 | PEsR-1 | 5.5 | PEsR-A | 71.1 | 2.0 | $CaCO_3$ particle 1 | 10.2 | 6.2 | 5.0 |
| Example 5 | 5 | PEsR-1 | 7.0 | PEsR-A | 69.7 | 2.0 | $CaCO_3$ particle 1 | 10.2 | 6.2 | 5.0 |
| Example 6 | 6 | PEsR-1 | 7.0 | PEsR-A | 69.7 | 2.0 | $CaCO_3$ particle 1 | 10.2 | 6.2 | 5.0 |
| Example 7 | 7 | PEsR-1 | 7.0 | PEsR-A | 69.7 | 2.0 | $CaCO_3$ particle 1 | 10.2 | 6.2 | 5.0 |
| Example 8 | 8 | PEsR-1 | 7.0 | PEsR-A | 69.7 | 2.0 | $CaCO_3$ particle 1 | 10.2 | 6.2 | 5.0 |
| Example 9 | 9 | SAR-1 | 7.0 | SAR-A | 69.7 | 2.0 | $CaCO_3$ particle 1 | 10.2 | 6.2 | 5.0 |
| Example 10 | 10 | SAR-2 | 7.0 | SAR-B | 69.7 | 2.0 | $CaCO_3$ particle 1 | 10.2 | 6.2 | 5.0 |
| Example 11 | 11 | PEsR-1 | 4.5 | PEsR-A | 77.0 | 2.0 | $CaCO_3$ particle 1 | 5.3 | 6.2 | 5.0 |

TABLE 3-continued

| Example/ | | Binder resin | | | | Crystalline polyester 1 | Inorganic fine particle | | Colorant 1 | Hydrocarbon wax (Release agent) |
|---|---|---|---|---|---|---|---|---|---|---|
| Comparative Example | Toner No. | Type | Amount (mass %) | Type | Amount (mass %) | Amount (mass%) | Type | Amount (mass %) | Amount (mass %) | Amount (mass %) |
| Example 12 | 12 | PEsR-1 | 4.0 | PEsR-A | 78.1 | 2.0 | $CaCO_3$ particle 1 | 4.7 | 6.2 | 5.0 |
| Example 13 | 13 | PEsR-1 | 7.0 | PEsR-A | 71.7 | — | $CaCO_3$ particle 1 | 10.2 | 6.2 | 5.0 |
| Example 14 | 14 | PEsR-1 | 7.0 | PEsR-A | 61.7 | 10.0 | $CaCO_3$ particle 1 | 10.2 | 6.2 | 5.0 |
| Example 15 | 15 | PEsR-1 | 7.0 | PEsR-A | 69.7 | 2.0 | $CaCO_3$ particle 2 | 10.2 | 6.2 | 5.0 |
| Example 16 | 16 | PEsR-1 | 7.0 | PEsR-A | 69.7 | 2.0 | $CaCO_3$ particle 3 | 10.2 | 6.2 | 5.0 |
| Example 17 | 17 | PEsR-1 | 7.0 | PEsR-A | 69.7 | 2.0 | $CaCO_3$ particle 4 | 10.2 | 6.2 | 5.0 |
| Example 18 | 18 | PEsR-1 | 7.0 | PEsR-A | 69.7 | 2.0 | $CaCO_3$ particle 5 | 10.2 | 6.2 | 5.0 |
| Example 19 | 19 | PEsR-1 | 7.0 | PEsR-A | 69.7 | 2.0 | $CaCO_3$ particle 6 | 10.2 | 6.2 | 5.0 |
| Example 20 | 20 | PEsR-1 | 7.0 | PEsR-A | 69.7 | 2.0 | $CaCO_3$ particle 7 | 10.2 | 6.2 | 5.0 |
| Example 21 | 21 | PEsR-2 | 7.0 | PEsR-A | 69.7 | 2.0 | $CaCO_3$ particle 1 | 10.2 | 6.2 | 5.0 |
| Example 22 | 22 | PEsR-3 | 7.0 | PEsR-A | 69.7 | 2.0 | $CaCO_3$ particle 1 | 10.2 | 6.2 | 5.0 |
| Example 23 | 23 | PEsR-1 | 7.0 | PEsR-A | 69.7 | 2.0 | $CaCO_3$ particle 2 | 10.2 | 6.2 | 5.0 |
| Example 24 | 24 | PEsR-1 | 7.0 | PEsR-A | 69.7 | 2.0 | $CaCO_3$ particle 5 | 10.2 | 6.2 | 5.0 |
| Example 25 | 25 | PEsR-1 | 7.0 | PEsR-A | 69.7 | 2.0 | $CaCO_3$ particle 5 | 10.2 | 6.2 | 5.0 |
| Example 26 | 26 | PEsR-1 | 7.0 | PEsR-A | 69.7 | 2.0 | $Al_2Si_2O_5(OH)_4$ particle 1 | 10.2 | 6.2 | 5.0 |
| Example 27 | 27 | PEsR-1 | 7.0 | PEsR-A | 69.7 | 2.0 | $Mg_3Si_4O_{10}(OH)_2$ particle 1 | 10.2 | 6.2 | 5.0 |
| Example 28 | 28 | PEsR-1 | 7.0 | PEsR-A | 69.7 | 2.0 | $BaSO_4$ particle 1 | 10.2 | 6.2 | 5.0 |
| Example 29 | 29 | PEsR-1 | 7.0 | PEsR-A | 69.7 | 2.0 | $CaCO_3$ particle 1 | 10.2 | 6.2 | 5.0 |
| Example 30 | 30 | PEsR-1 | 7.0 | PEsR-A | 69.7 | 2.0 | $CaCO_3$ particle 1 | 10.2 | 6.2 | 5.0 |
| Example 31 | 31 | PEsR-1 | 7.0 | PEsR-A | 69.7 | 2.0 | $CaCO_3$ particle 1 | 10.2 | 6.2 | 5.0 |
| Example 32 | 32 | PEsR-1 | 7.0 | PEsR-A | 69.7 | 2.0 | $CaCO_3$ particle 1 | 10.2 | 6.2 | 5.0 |
| Example 33 | 33 | PEsR-1 | 7.0 | PEsR-A | 69.7 | 2.0 | $CaCO_3$ particle 8 | 10.2 | 6.2 | 5.0 |
| Example 34 | 34 | SAR-2 | 3.2 | SAR-B | 79.0 | 2.0 | $CaCO_3$ particle 1 | 4.6 | 6.2 | 5.0 |
| Example 35 | 35 | SAR-2 | 2.6 | SAR-B | 80.4 | 2.0 | $CaCO_3$ particle 1 | 3.8 | 6.2 | 5.0 |
| Example 36 | 36 | SAR-1 | 1.8 | SAR-A | 82.4 | 2.0 | $CaCO_3$ particle 1 | 2.6 | 6.2 | 5.0 |
| Example 37 | 37 | PEsR-1 | 10.7 | PEsR-A | 57.3 | 2.0 | $CaCO_3$ particle 1 | 18.7 | 6.2 | 5.0 |
| Example 38 | 38 | PEsR-1 | 10.7 | PEsR-A | 57.3 | 2.0 | $CaCO_3$ particle 1 | 18.7 | 6.2 | 5.0 |
| Example 39 | 39 | PEsR-1 | 10.7 | PEsR-A | 57.3 | 2.0 | $CaCO_3$ particle 1 | 18.7 | 6.2 | 5.0 |
| Example 40 | 40 | PEsR-1 | 10.7 | PEsR-A | 57.3 | 2.0 | $CaCO_3$ particle 1 | 18.7 | 6.2 | 5.0 |
| Example 41 | 41 | PEsR-1 | 11.0 | PEsR-A | 56.3 | 2.0 | $CaCO_3$ particle 1 | 19.5 | 6.2 | 5.0 |
| Example 42 | 42 | PEsR-1 | 17.3 | PEsR-A | 35.3 | 2.0 | $CaCO_3$ particle 1 | 34.2 | 6.2 | 5.0 |
| Example 43 | 43 | PEsR-1 | 17.3 | PEsR-A | 35.3 | 2.0 | $CaCO_3$ particle 1 | 34.2 | 6.2 | 5.0 |
| Comparative Example 1 | 44 | PEsR-1 | 7.0 | PEsR-A | 69.7 | 2.0 | $CaCO_3$ particle 1 | 10.2 | 6.2 | 5.0 |
| Comparative Example 2 | 45 | PEsR-1 | 1.0 | PEsR-A | 84.3 | 2.0 | $CaCO_3$ particle 1 | 1.5 | 6.2 | 5.0 |
| Comparative Example 3 | 46 | PEsR-1 | 17.3 | PEsR-A | 35.3 | 2.0 | $CaCO_3$ particle 1 | 34.2 | 6.2 | 5.0 |

TABLE 3-continued

| Example/ Comparative Example | Toner No. | Binder resin Type | Amount (mass %) | Type | Amount (mass %) | Crystalline polyester 1 Amount (mass%) | Inorganic fine particle Type | Amount (mass %) | Colorant 1 Amount (mass %) | Hydrocarbon wax (Release agent) Amount (mass %) |
|---|---|---|---|---|---|---|---|---|---|---|
| Comparative Example 4 | 47 | PEsR-1 | 18.0 | PEsR-A | 33.0 | 2.0 | $CaCO_3$ particle 1 | 35.8 | 6.2 | 5.0 |
| Comparative Example 5 | 48 | PEsR-1 | 7.0 | PEsR-A | 69.7 | 2.0 | $CaCO_3$ particle 9 | 10.2 | 6.2 | 5.0 |
| Comparative Example 6 | 49 | PEsR-1 | 7.0 | PEsR-A | 69.7 | 2.0 | $CaCO_3$ particle 10 | 10.2 | 6.2 | 5.0 |

Physical property values of the toner 1 to 49 according to Example 1 to 43 and Comparative Example 1 to 6 are collectively shown in Table 4.

TABLE 4

| | | Ester group | Primary particle diameter | | Cross-sectional observation | | | | | | |
|---|---|---|---|---|---|---|---|---|---|---|---|
| | | Mr × (Er/100)/Mc | Dc (nm) | Da/ Dc | ST/S × 100 | SA/S × 100 | SB/S × 100 | Dd (nm) | Dmax /Dd | Pa (%) | Sc /Sp |
| Example 1 | Toner 1 | 2.3 | 400 | 1.2 | 3.0 | 1.5 | 0.9 | 450 | 4.0 | 0.8 | 3.0 |
| Example 2 | Toner 2 | 1.3 | 400 | 1.2 | 5.0 | 2.5 | 1.6 | 450 | 4.0 | 0.8 | 3.0 |
| Example 3 | Toner 3 | 1.3 | 400 | 1.2 | 5.0 | 2.5 | 1.6 | 450 | 4.0 | 0.4 | 3.0 |
| Example 4 | Toner 4 | 1.3 | 400 | 1.2 | 5.0 | 2.5 | 1.6 | 450 | 4.0 | 0.8 | 0.0 |
| Example 5 | Toner 5 | 1.3 | 400 | 1.2 | 5.0 | 1.9 | 1.2 | 429 | 3.7 | 0.7 | 0.4 |
| Example 6 | Toner 6 | 1.3 | 400 | 1.2 | 5.0 | 2.0 | 1.3 | 432 | 3.8 | 0.8 | 0.6 |
| Example 7 | Toner 7 | 1.3 | 400 | 1.2 | 5.0 | 3.4 | 2.2 | 538 | 4.3 | 0.8 | 4.8 |
| Example 8 | Toner 8 | 1.3 | 400 | 1.2 | 5.0 | 4.0 | 2.5 | 591 | 4.5 | 0.8 | 5.2 |
| Example 9 | Toner 9 | 0.3 | 400 | 1.2 | 5.0 | 3.1 | 2.0 | 493 | 4.1 | 0.8 | 3.8 |
| Example 10 | Toner 10 | 0.7 | 400 | 1.2 | 5.0 | 2.8 | 1.7 | 472 | 4.0 | 0.8 | 3.4 |
| Example 11 | Toner 11 | 2.8 | 400 | 1.2 | 2.5 | 1.5 | 0.9 | 485 | 4.1 | 0.8 | 3.0 |
| Example 12 | Toner 12 | 3.1 | 400 | 1.2 | 2.2 | 1.4 | 0.9 | 499 | 4.1 | 0.8 | 2.9 |
| Example 13 | Toner 13 | 1.3 | 400 | 1.2 | 5.0 | 2.5 | 1.6 | 450 | 4.0 | 0.8 | 3.0 |
| Example 14 | Toner 14 | 1.4 | 400 | 1.2 | 5.0 | 2.3 | 1.5 | 445 | 3.9 | 0.8 | 2.4 |
| Example 15 | Toner 15 | 1.3 | 150 | 1.2 | 5.0 | 3.5 | 2.0 | 223 | 4.2 | 0.7 | 4.5 |
| Example 16 | Toner 16 | 1.3 | 300 | 1.2 | 5.0 | 2.8 | 1.7 | 355 | 4.0 | 0.7 | 3.4 |
| Example 17 | Toner 17 | 1.3 | 700 | 1.2 | 5.0 | 2.2 | 1.3 | 768 | 3.8 | 0.8 | 1.5 |
| Example 18 | Toner 18 | 1.3 | 900 | 1.2 | 5.0 | 2.0 | 1.1 | 967 | 3.6 | 0.9 | 0.9 |
| Example 19 | Toner 19 | 1.3 | 400 | 1.4 | 5.0 | 2.9 | 1.8 | 478 | 4.1 | 0.8 | 2.6 |
| Example 20 | Toner 20 | 1.3 | 400 | 1.6 | 5.0 | 1.8 | 2.1 | 509 | 4.2 | 0.8 | 2.5 |
| Example 21 | Toner 21 | 1.3 | 400 | 1.2 | 5.0 | 4.2 | 2.6 | 668 | 4.8 | 0.9 | 6.4 |
| Example 22 | Toner 22 | 1.3 | 400 | 1.2 | 5.0 | 4.4 | 2.8 | 717 | 5.2 | 0.9 | 6.7 |
| Example 23 | Toner 23 | 1.3 | 150 | 1.2 | 5.0 | 2.8 | 1.6 | 180 | 4.1 | 0.7 | 3.2 |

TABLE 4-continued

| | | Ester group | Primary particle diameter | | Cross-sectional observation | | | | | | |
|---|---|---|---|---|---|---|---|---|---|---|---|
| | | Mr × (Er/100)/Mc | Dc (nm) | Da/ Dc | ST/S × 100 | SA/S × 100 | SB/S × 100 | Dd (nm) | Dmax /Dd | Pa (%) | Sc /Sp |
| Example 24 | Toner 24 | 1.3 | 900 | 1.2 | 5.0 | 4.3 | 2.8 | 1460 | 5.2 | 0.9 | 6.5 |
| Example 25 | Toner 25 | 1.3 | 900 | 1.2 | 5.0 | 4.5 | 2.9 | 1570 | 5.2 | 0.9 | 6.9 |
| Example 26 | Toner 26 | 1.3 | 400 | 1.2 | 5.1 | 2.5 | 1.6 | 453 | 4.1 | 0.8 | 2.9 |
| Example 27 | Toner 27 | 1.3 | 1000 | 1.2 | 5.0 | 2.0 | 0.9 | 1074 | 3.5 | 0.9 | 0.7 |
| Example 28 | Toner 28 | 1.3 | 500 | 1.2 | 3.0 | 1.5 | 0.9 | 568 | 4.0 | 0.8 | 3.0 |
| Example 29 | Toner 29 | 1.3 | 400 | 1.2 | 5.0 | 0.7 | 0.3 | 389 | 3.2 | 0.7 | 0.1 |
| Example 30 | Toner 30 | 1.3 | 400 | 1.2 | 5.0 | 1.5 | 0.4 | 416 | 3.3 | 0.7 | 0.2 |
| Example 31 | Toner 31 | 1.3 | 400 | 1.2 | 5.0 | 1.7 | 0.7 | 422 | 3.4 | 0.8 | 0.2 |
| Example 32 | Toner 32 | 1.3 | 400 | 1.2 | 5.0 | 4.7 | 3.1 | 771 | 6.0 | 0.8 | 7.8 |
| Example 33 | Toner 33 | 1.3 | 400 | 1.2 | 5.0 | 0.7 | 0.3 | 389 | 3.2 | 0.7 | 0.1 |
| Example 34 | Toner 34 | 1.7 | 400 | 1.2 | 2.2 | 0.7 | 0.3 | 418 | 3.3 | 0.8 | 0.0 |
| Example 35 | Toner 35 | 2.2 | 400 | 1.2 | 1.7 | 0.7 | 0.3 | 435 | 3.5 | 0.8 | 0.0 |
| Example 36 | Toner 36 | 1.3 | 400 | 1.2 | 1.3 | 0.7 | 0.3 | 465 | 3.7 | 0.8 | 0.0 |
| Example 37 | Toner 37 | 0.6 | 400 | 1.2 | 9.8 | 4.0 | 2.5 | 434 | 3.6 | 0.8 | 1.0 |
| Example 38 | Toner 38 | 0.6 | 400 | 1.2 | 9.8 | 4.7 | 2.8 | 450 | 3.8 | 0.8 | 2.8 |
| Example 39 | Toner 39 | 0.6 | 400 | 1.2 | 9.8 | 5.3 | 3.3 | 466 | 4.2 | 0.8 | 3.3 |
| Example 40 | Toner 40 | 0.6 | 400 | 1.2 | 9.8 | 8.0 | 5.2 | 606 | 4.9 | 0.9 | 6.4 |
| Example 41 | Toner 41 | 0.6 | 400 | 1.2 | 10.3 | 4.0 | 2.5 | 430 | 3.6 | 0.8 | 0.9 |
| Example 42 | Toner 42 | 0.3 | 400 | 1.2 | 19.6 | 4.0 | 2.3 | 402 | 3.3 | 0.8 | 0.2 |
| Example 43 | Toner 43 | 0.3 | 400 | 1.2 | 19.6 | 9.7 | 6.0 | 454 | 4.1 | 0.8 | 2.9 |
| Comparative Example 1 | Toner 44 | 1.3 | 400 | 1.2 | 5.0 | 0.3 | 0.0 | 386 | 2.5 | 0.5 | 0.0 |
| Comparative Example 2 | Toner 45 | 10.5 | 400 | 1.2 | 0.7 | 0.6 | 0.2 | 624 | 4.2 | 0.8 | 0.6 |
| Comparative Example 3 | Toner 46 | 0.3 | 400 | 1.2 | 19.6 | 10.3 | 6.5 | 462 | 4.3 | 0.8 | 3.1 |
| Comparative Example 4 | Toner 47 | 0.3 | 400 | 1.2 | 20.6 | 9.7 | 5.8 | 448 | 3.9 | 0.8 | 2.8 |
| Comparative Example 5 | Toner 48 | 1.3 | 50 | 1.2 | 5.0 | 3.5 | 2.0 | 70 | 4.2 | 0.6 | 4.4 |
| Comparative Example 6 | Toner 49 | 1.3 | 1100 | 1.2 | 5.0 | 2.0 | 1.1 | 1181 | 3.8 | 0.9 | 0.7 |

Each of the toners according to the above-described Examples and Comparative Examples and a ferrite carrier (with average particle diameter: 42 μm) whose surface had been coated with a silicone resin were mixed so that the toner concentration became 8% by mass, thereby preparing a two-component developer. A modified machine of a printer for digital commercial printing (Trade name: imageRUNNER ADVANCE C 9075 PRO, manufactured by Canon Inc.) was used as an image forming apparatus.

The two-component developer of each toner was put in a developing unit of the modified machine, and a direct current voltage VDC of a developer bearing member, a charging voltage VD of an electrostatic latent image-bearing member, and a laser power were adjusted so that a toner laid-on level on the electrostatic latent image-bearing member or a paper became a desired amount, and then an evaluation described later was conducted. A point of modification in the modified machine was that fixing temperature and the process speed could be set arbitrarily.

The following evaluation test was conducted to evaluate the toner.

<Evaluation 1: Hot Offset Resistance>

Paper: A4 paper CS-680 (68.0 g/m$^2$)

Toner laid-on level: 0.08 mg/cm$^2$

Image to be evaluated: A single-color halftone image (2 cm×2 cm) was set at the center of the A4 paper.

Fixing test environment: normal temperature and low humidity environment: temperature of 23° C./humidity of 5% RH (hereinafter, "N/L")

Process speed: 260 mm/sec

Fixing temperature: 200° C.

After the unfixed image described above was created, an evaluation value for fogging was determined and used as an evaluation index of the hot offset resistance.

As a procedure, first, 10 plain postcards were fed to the center position of the fixing belt, and then A4 paper (paper to be evaluated) having the unfixed image created described above was fed. Thereafter, an average reflectance Dr (%) of the paper to be evaluated before imaging and a reflectance Ds (%) of the white background portion after the fixing test were measured with a reflectometer (Trade name: REFLECTOMETER MODEL TC-6 DS, manufactured by Tokyo Denshoku Co., Ltd.), and the evaluation value for fogging was calculated using the following formula.

The obtained evaluation value for fogging was ranked according to the following evaluation criteria.

$$\text{Fogging }(\%)=Dr(\%)-Ds(\%)$$

The lower the evaluation value of fogging, the higher the hot offset resistance.

(Evaluation Criteria)

A: less than 0.25%

B: 0.25% or more and less than 0.50%

C: 0.50% or more and less than 0.75%

D: 0.75% or more and less than 1.00%

E: 1.00% or more

The evaluation results are shown in Table 5.

<Evaluation 2: Abrasion Resistance>

Paper: Oce Top Coated Plus Silk 270 g (270.0 g/m$^2$)

Toner laid-on level: 0.20 mg/cm$^2$

Image to be evaluated: A single-color halftone image (5 cm×25 cm) was set on the above-described A4 paper.

Fixing test environment: normal temperature and normal humidity environment: temperature of 23° C./humidity of 50% RH Process speed: 450 mm/sec Fixing temperature: 150° C.

The image obtained under the above conditions was cut into a strip shape and set upward in the apparatus described below. Nothing but a piece of paper was set in the damper unit, and a rubbing test was conducted under the following conditions.

Rubbing tester: Color fastness rubbing tester (AB-301)

Weight: 500 g (0.5 kgf)

Stroke: 10 cycles

Toner was transferred to the rubbed paper (rubbing paper), and for this rubbing paper and white paper, L*, a*, and b* of the image of each gradation were measured using SpectroScan Transmission (manufactured by GretagMacbeth LLC) (measurement conditions: D50 illuminant; viewing angle of 2°). ΔE obtained by the following formula was compared and used as an index for an evaluation of the abrasion resistance.

$$\Delta E=(\text{rubbing paper})\{(L^*)^2+(a^*)^2+(B^*)^2\}^{0.5}-(\text{white paper})\{(L^*)^2+(a^*)^2+(B^*)^2\}^{0.5}$$

The lower the ΔE, the higher the abrasion resistance.

(Evaluation Criteria)

A: less than 3.0

B: 3.0 or more and less than 5.0

C: 5.0 or more and less than 7.0

D: 7.0 or more and less than 10.0

E: 10.0 or more

The evaluation results are shown in Table 5.

TABLE 5

| | | Evaluation | | | |
|---|---|---|---|---|---|
| | | Abrasion resistance | | Hot offset resistance | |
| | | ΔE | Rank | Fogging | Rank |
| Example 1 | Toner 1 | 1.0 | A | 0.24 | A |
| Example 2 | Toner 2 | 1.4 | A | 0.21 | A |
| Example 3 | Toner 3 | 1.9 | A | 0.45 | B |
| Example 4 | Toner 4 | 3.2 | B | 0.18 | A |
| Example 5 | Toner 5 | 2.5 | A | 0.18 | A |
| Example 6 | Toner 6 | 1.9 | A | 0.18 | A |
| Example 7 | Toner 7 | 0.8 | A | 0.29 | A |
| Example 8 | Toner 8 | 0.8 | A | 0.37 | B |
| Example 9 | Toner 9 | 1.4 | A | 0.48 | B |
| Example 10 | Toner 10 | 1.4 | A | 0.37 | B |
| Example 11 | Toner 11 | 3.2 | B | 0.21 | A |
| Example 12 | Toner 12 | 4.1 | B | 0.29 | A |
| Example 13 | Toner 13 | 3.6 | B | 0.18 | A |
| Example 14 | Toner 14 | 1.0 | A | 0.61 | C |
| Example 15 | Toner 15 | 5.2 | C | 0.05 | A |
| Example 16 | Toner 16 | 2.5 | A | 0.13 | A |
| Example 17 | Toner 17 | 1.4 | A | 0.37 | B |
| Example 18 | Toner 18 | 2.5 | A | 0.61 | C |
| Example 19 | Toner 19 | 2.5 | A | 0.37 | B |
| Example 20 | Toner 20 | 3.6 | B | 0.50 | B |
| Example 21 | Toner 21 | 1.4 | A | 0.48 | B |
| Example 22 | Toner 22 | 2.5 | A | 0.69 | C |
| Example 23 | Toner 23 | 6.3 | C | 0.05 | A |
| Example 24 | Toner 24 | 1.7 | A | 0.77 | C |
| Example 25 | Toner 25 | 3.1 | B | 0.93 | D |
| Example 26 | Toner 26 | 2.5 | A | 0.45 | B |
| Example 27 | Toner 27 | 3.6 | B | 0.77 | C |
| Example 28 | Toner 28 | 2.5 | A | 0.45 | B |
| Example 29 | Toner 29 | 6.9 | C | 0.13 | A |
| Example 30 | Toner 30 | 5.8 | C | 0.13 | A |
| Example 31 | Toner 31 | 4.7 | B | 0.13 | A |
| Example 32 | Toner 32 | 3.0 | B | 0.93 | D |
| Example 33 | Toner 33 | 6.3 | C | 0.13 | A |
| Example 34 | Toner 34 | 6.9 | C | 0.45 | B |
| Example 35 | Toner 35 | 7.2 | C | 0.69 | C |
| Example 36 | Toner 36 | 7.4 | C | 0.93 | D |
| Example 37 | Toner 37 | 3.0 | B | 0.29 | A |
| Example 38 | Toner 38 | 4.1 | B | 0.37 | B |
| Example 39 | Toner 39 | 5.2 | C | 0.45 | B |
| Example 40 | Toner 40 | 6.3 | C | 0.69 | C |
| Example 41 | Toner 41 | 5.2 | C | 0.29 | A |
| Example 42 | Toner 42 | 7.4 | D | 0.21 | A |
| Example 43 | Toner 43 | 8.5 | D | 0.37 | B |
| Comparative Example 1 | Toner 44 | 10.7 | E | 0.13 | A |
| Comparative Example 2 | Toner 45 | 8.5 | D | 1.17 | E |
| Comparative Example 3 | Toner 46 | 10.2 | E | 0.50 | B |
| Comparative Example 4 | Toner 47 | 11.3 | E | 0.45 | B |
| Comparative Example 5 | Toner 48 | 10.2 | E | 0.05 | A |
| Comparative Example 6 | Toner 49 | 3.6 | B | 1.04 | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209735, filed Dec. 17, 2020, and Japanese Patent Application No. 2021-179772, filed Nov. 2, 2021, which are hereby incorporated by reference herein in their entirety.

What is claimed is:

1. A toner, comprising:

a toner particle containing a resin component and an inorganic fine particle;

the resin component containing a binder resin and a crystalline polyester resin;

a content of the crystalline polyester resin in the toner particle being 0.5 to 10.0 mass %; and the inorganic fine particle being at least one member selected from the group consisting of a particle containing $Mg_3Si_4O_{10}(OH)_2$ and a particle containing $Al_2Si_2O_5(OH)_4$, wherein Dc is 100-1000 nm when Dc is a number average particle diameter of a primary particle of the inorganic fine particle, an inorganic fine particle domain A having a dispersion diameter of at least 2.0 times Dc is present in a cross section of the toner particle, and $$1.0 \leq ST/S \times 100 \leq 20.0 \text{ and } 0.5 \leq SA/S \times 100 \leq 10.0$$

when S is an area of the cross section of the toner particle, ST is a sum of areas occupied by the inorganic fine particle in the cross section, and SA is a sum of areas occupied by the inorganic fine particle domain A in the cross section.

2. The toner according to claim 1, wherein an inorganic fine particle domain B having a dispersion diameter of at least 3.0 times Dc is present in the cross section, and $0.5 \leq SB/S \times 100 \leq 10.0$ when SB is a sum of areas occupied by the inorganic fine particle domain B in the cross section.

3. The toner according to claim 2, wherein $$2.0 \leq ST/S \times 100 \leq 10.0$$

$$0.5 \leq SA/S \times 100 \leq 5.0 \text{ and}$$

$$0.5 \leq SB/S \times 100 \leq 5.0.$$

4. The toner according to claim 1, wherein Dd is 200-1500 nm when Dd is a number average value of a dispersion diameter of the inorganic fine particle in the cross section.

5. The toner according to claim 1, wherein $Ddmax/Dd \leq 5.0$ when Ddmax is a maximum value of a dispersion diameter of the inorganic fine particle in the cross section.

6. The toner according to claim 1, wherein $Da/Dc \leq 1.5$ when Da is an area average particle diameter of a primary particle of the inorganic fine particle.

7. The toner according to claim 1, wherein Dc is 200 to 800 nm.

8. The toner according to claim 1, wherein the resin component has an ester group, and $0.5 \leq Mr \times (Er/100)/Mc \leq 3.0$ when Mr (mass %) is a content ratio of the resin component contained in the toner particle, Er (mass %) is a content ratio of an ester group in the resin component, and Mc (mass %) is a content ratio of the inorganic fine particle contained in the toner particle.

9. The toner according to claim 1, wherein the toner particle further contains a colorant, and $0.5 \leq SC/SP \times 100 \leq 5.0$ when SP is a sum of areas occupied by the colorant in the cross section and SC is a sum of areas occupied by the colorant in the inorganic fine particle domain A.

10. A method of producing a toner, comprising a toner particle containing a resin component and an inorganic fine particle;

the resin component containing a binder resin and a crystalline polyester resin;

the binder resin comprising a binder resin A and a binder resin B;

a content of the crystalline polyester resin in the toner particle being 0.5 to 10.0 mass %; and the inorganic fine particle being at least one member selected from the group consisting of a particle containing $Mg_3Si_4O_{10}(OH)_2$ and a particle containing $Al_2Si_2O_5(OH)_4$, wherein Dc is 100-1000 nm when Dc is a number average particle diameter of a primary particle of the inorganic fine particle an inorganic fine particle domain A having a dispersion diameter of at least 2.0 times Dc is present in a cross section of the toner particle, and $$1.0 \leq ST/S \times 100 \leq 20.0 \text{ and } 0.5 \leq SA/S \times 100 \leq 10.0$$

when S is an area of the cross section of the toner particle, ST is a sum of areas occupied by the inorganic fine particle in the cross section, and SA is a sum of areas occupied by the inorganic fine particle domain A in the cross section, the method comprising the steps of:

an inorganic fine particle pre-kneading step of melt-kneading a mixture containing binder resin A and the inorganic fine particle to obtain an inorganic fine particle mixture; and a kneading step of melt-kneading a mixture containing the inorganic fine particle mixture and binder resin B.

* * * * *